US012572825B2

(12) United States Patent
Cho et al.

(10) Patent No.: US 12,572,825 B2
(45) Date of Patent: Mar. 10, 2026

(54) ARTIFICIAL INTELLIGENCE OVERTOPPING PREDICTION DEVICE AND OVERTOPPING PREDICTION SYSTEM USING THE SAME

(71) Applicant: Republic of Korea (National Disaster Management Research Institute), Ulsan (KR)

(72) Inventors: Si Beum Cho, Ulsan (KR); Jong Ryul Park, Ulsan (KR); Dong Seag Kim, Ulsan (KR); Dong Hwan Kim, Ulsan (KR); Yeong Han Jeong, Yangsan-si (KR); Sang Yeop Lee, Ulsan (KR); Sung Jin Hong, Ulsan (KR)

(73) Assignee: Republic of Korea (National Disaster Management Research Institute), Ulsan (KR)

( * ) Notice: Subject to any disclaimer, the term of this patent is extended or adjusted under 35 U.S.C. 154(b) by 470 days.

(21) Appl. No.: 18/201,490

(22) Filed: May 24, 2023

(65) Prior Publication Data

US 2023/0385658 A1 Nov. 30, 2023

(30) Foreign Application Priority Data

May 24, 2022 (KR) ........................ 10-2022-0063466

(51) Int. Cl.
*G06N 5/022* (2023.01)
*G01C 13/00* (2006.01)
(Continued)

(52) U.S. Cl.
CPC ........... *G06N 5/022* (2013.01); *G01C 13/004* (2013.01); *G01W 1/10* (2013.01); *G01W 1/00* (2013.01);
(Continued)

(58) Field of Classification Search
CPC ...... G06N 5/022; G06N 20/00; G01C 13/004; G01W 1/10; G01W 1/08; G01W 1/02; G01W 1/00
See application file for complete search history.

(56) References Cited

FOREIGN PATENT DOCUMENTS

CN      210658205 U   *   6/2020
CN      215449227 U     1/2022
(Continued)

OTHER PUBLICATIONS

Sung Joon Na, "The Fundamental Study for a Wave overtopping Forecast on the East Coast" Research, Department of Atmospheric Environment Information Engineering, Graduate School of Inje University, 2009, pp. 15-108.
(Continued)

*Primary Examiner* — Lisa M Caputo
*Assistant Examiner* — Christian T Bryant
(74) *Attorney, Agent, or Firm* — Bridgeway IP Law Group, PLLC; Sang Ho Lee; Hyun Woo Shin

(57) ABSTRACT

Provided is an artificial intelligence overtopping prediction device including first and second pressure measurement parts 103 and 105 configured to measure a collision pressure of waves colliding with a marine structure 10 and a pressure of waves introduced into a road surface 20, an overtopping alert part 109 configured to collect images around the overtopping prediction device 100 and output an alert sound, an information collection and control part 107 including a drone storage 170 configured to fly the drone 202, and a collection controller 160 configured to control the overtopping prediction device 100, receive and store the wave pressure information and the overtopping amount information, and transmit the information to an overtopping prediction system 500 to predict and generate overtopping prediction information, and a frame part 101 including a support
(Continued)

frame 110. Also, disclosed herein is an overtopping prediction system using the artificial intelligence overtopping prediction device 100.

20 Claims, 15 Drawing Sheets

(51) Int. Cl.

| | | |
|---|---|---|
| *G01W 1/00* | (2006.01) | |
| *G01W 1/02* | (2006.01) | |
| *G01W 1/08* | (2006.01) | |
| *G01W 1/10* | (2006.01) | |
| *G06N 20/00* | (2019.01) | |

(52) U.S. Cl.
CPC ................ *G01W 1/02* (2013.01); *G01W 1/08* (2013.01); *G06N 20/00* (2019.01)

(56) References Cited

FOREIGN PATENT DOCUMENTS

| | | | |
|---|---|---|---|
| JP | 2007-018291 | A | 1/2007 |
| JP | 2013-217180 | A | 10/2013 |
| KR | 10-2006-0102191 | A | 9/2006 |
| KR | 10-1190321 | B1 | 10/2012 |
| KR | 10-2091465 | B1 | 3/2020 |
| KR | 10-2226260 | B1 | 3/2021 |
| KR | 10-2323563 | B1 | 11/2021 |
| KR | 10-2387426 | B1 | 4/2022 |

OTHER PUBLICATIONS

Young-Taek Kim et al., "Wave Overtopping Formula for Impulsive and Non-Impulsive Wave Conditions against Vertical Wall", Journal of Korean Society of Coastal and Ocean Engineers, Jun. 2015, pp. 175-181, vol. 27, issue. 3.

* cited by examiner

| Scale | Name | Sea condition | wind speed(m/s) | wave height(m) | Photo |
|---|---|---|---|---|---|
| 0 | Calm | Flat | 0.0~0.2 | 0 | |
| 1 | light air | Ripples without crests | 0.3~1.5 | 0.1 | |
| 2 | light breeze | Small wavelets. Crests of glassy appearance, not breaking | 1.6~3.3 | 0.2 | |
| 3 | gentle breeze | Large wavelets. Crests begin to break; scattered whitecaps | 3.4~5.4 | 0.6 | |
| 4 | moderate breeze | Small waves | 5.5~7.9 | 1 | |
| 5 | fresh breeze | Moderate (1.2 m) longer waves. Some foam and spray | 8.0~10.7 | 2 | |
| 6 | strong breeze | Large waves with foam crests and some spray | 10.8~13.8 | 3 | |
| 7 | near gale | High waves (6-7 m) with dense foam. Wave crests start to roll over. Considerable spray | 13.9~17.1 | 4 | |

FIG. 1

PRIOR ART

| Scale | Name | Sea condition | wind speed(m/s) | wave height(m) | Photo |
|---|---|---|---|---|---|
| 8 | gale | Very high waves. Large patches of foam from wave crests give the sea a white a p p e a r a n c e . Considerable tumbling of waves with heavy impact. Large amounts of airborne spray reduce visibility | 17.2~20.7 | 5.5 | |
| 9 | strong gale | High waves (6-7 m) with dense foam. Wave crests start to roll over. Considerable spray | 20.8~24.4 | 7 | |
| 10 | storm | Very high waves. Large patches of foam from wave crests give the sea a white a p p e a r a n c e . Considerable tumbling of waves with heavy impact. Large amounts of airborne spray reduce visibility | 24.5~28.4 | 9 | |
| 11 | violent storm | Exceptionally high waves. Very large patches of foam, driven before the wind, cover much of the sea surface. Very large amounts of airborne spray severely reduce visibility | 28.5~32.6 | 11.5 | |
| 12 | hurricane | Huge waves. Sea is completely white with foam and spray. Air is filled with driving spray, greatly reducing visibility | 32.7 이상 | 14이상 | |

FIG. 2

PRIOR ART

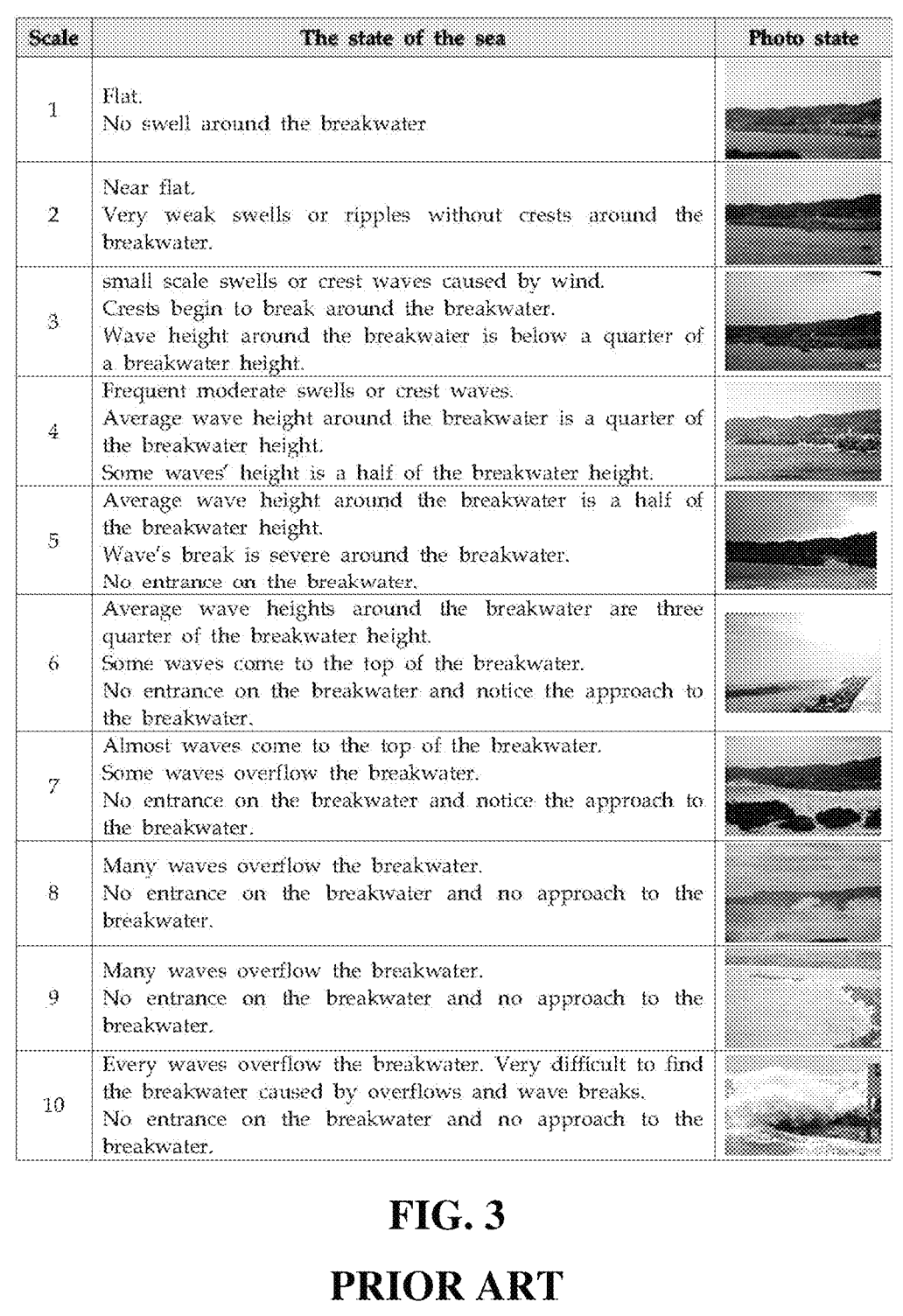

| Scale | The state of the sea | Photo state |
|---|---|---|
| 1 | Flat.<br>No swell around the breakwater | |
| 2 | Near flat.<br>Very weak swells or ripples without crests around the breakwater. | |
| 3 | small scale swells or crest waves caused by wind.<br>Crests begin to break around the breakwater.<br>Wave height around the breakwater is below a quarter of a breakwater height. | |
| 4 | Frequent moderate swells or crest waves.<br>Average wave height around the breakwater is a quarter of the breakwater height.<br>Some waves' height is a half of the breakwater height. | |
| 5 | Average wave height around the breakwater is a half of the breakwater height.<br>Wave's break is severe around the breakwater.<br>No entrance on the breakwater. | |
| 6 | Average wave heights around the breakwater are three quarter of the breakwater height.<br>Some waves come to the top of the breakwater.<br>No entrance on the breakwater and notice the approach to the breakwater. | |
| 7 | Almost waves come to the top of the breakwater.<br>Some waves overflow the breakwater.<br>No entrance on the breakwater and notice the approach to the breakwater. | |
| 8 | Many waves overflow the breakwater.<br>No entrance on the breakwater and no approach to the breakwater. | |
| 9 | Many waves overflow the breakwater.<br>No entrance on the breakwater and no approach to the breakwater. | |
| 10 | Every waves overflow the breakwater. Very difficult to find the breakwater caused by overflows and wave breaks.<br>No entrance on the breakwater and no approach to the breakwater. | |

FIG. 3

PRIOR ART

ARTIFICIAL INTELLIGENCE OVERTOPPING PREDICTION DEVICE AND OVERTOPPING PREDICTION SYSTEM USING THE SAME

CROSS-REFERENCE TO RELATED APPLICATION

This application claims priority to and the benefit of Korean Patent Application No. 10-2022-0063466, filed on May 24, 2022, the disclosure of which is incorporated herein by reference in its entirety.

BACKGROUND

1. Field of the Invention

The present disclosure relates to an artificial intelligence overtopping prediction device and an overtopping prediction system using the same, and more particularly, to an artificial intelligence overtopping prediction device that is installed adjacent to a marine structure and is capable of collecting image information on waves moving toward the marine structure, analyzing the occurrence of high waves toward marine structure in real time, analyzing information on the pressure of waves colliding with the marine structure to identify the possibility of overtopping regardless of the shape of the coastal area and seasonal changes, analyzing collected information by artificial intelligence to generate reliable prediction information about whether overtopping will occur in the coastal area, and accurately determining the degree of overtopping not only during the day but also at night to prevent damage that may be caused by overtopping when the occurrence and risk of overtopping in various forms are expected, and an overtopping prediction system using the same.

2. Description of the Related Art

In general, coastal disasters, which result from natural forces, are extreme events that adversely affect human habitation and the environment.

The seaside and coastal zones are areas having spatial characteristics of connecting the land and the sea, and correspond to areas where the economic and social activities of the world's population are concentrated. On the other hand, the seaside and coastal zones are inevitably the areas most susceptible to the effects of marine disasters such as seawater flooding, typhoons and tidal waves, high waves, dangerous rip currents, tsunamis, abnormal long waves, and coastal erosion. As a result, various natural disasters including marine disasters frequently occur in coastal areas, causing considerable damages to countless lives and property.

In particular, huge waves caused by typhoons in summer and high waves caused by northwest monsoons in winter result in seawater flooding, wave invasion, and overtopping, which frequently cause damages in many coastal urban areas. However, sufficient countermeasures have not been established yet.

The above-mentioned overtopping (wave overtopping), which occurs in connection with various meteorological or seismic phenomena, such as strong low pressure, northeast air currents, and tsunamis, as well as typhoons, refers to the phenomenon in which seawater crosses over the crest of a breakwater or embankment due to the rise of waves.

Although the overtopping occurs steadily every year, the scale and degree of damage are often overlooked and people are not prepared for the overtopping unlike typhoons, resulting in increased loss of lives and property. Overtopping takes many forms, depending on topographical influences and the conditions of the structure, such as seawalls. It is very important to predict the occurrence and risk of overtopping in advance, and to establish preventive measures based on the predicted results.

However, as described above, it is not easy to predict the risk of overtopping because overtopping occurs in an instant and suddenly due to swell waves.

In particular, since the shapes of the seaside and coastal zone are very diverse, predicting the risk of overtopping can be time-consuming and costly.

In this regard, Korean Patent No. 10-1190321 (hereinafter referred to as Patent Document 1) discloses a three-dimensional breakwater simulation system including a wave data storage configured to store wave characteristic data including at least one of wave height, wavelength, period, or wave direction according to region and time; a wave model generator configured to generate a three-dimensional wave model based on the wave characteristic data stored in the wave data storage; a breakwater data storage configured to store breakwater characteristic data including at least one of a water depth at a location where the breakwater is installed, a shape, height, width, surface strength, and porosity of the breakwater; a breakwater model generator configured to generate a three-dimensional breakwater model based on the breakwater characteristic data stored in the breakwater data storage; a breakwater characteristics predictor configured to predict breakwater characteristics including a half-wave coefficient of the wave model, an overtopping amount, and stability of the breakwater according to the breakwater characteristic data of the breakwater model; a wave data selector configured to select at least one wave characteristic data from among the wave characteristic data stored in the wave data storage; and a wave numerical analyzer configured to numerically analyze the wave based on the wave characteristic data selected by the wave data selector, wherein the wave model generator generates the wave model based on the wave characteristic data selected by the wave data selector and the wave numerically analyzed by the wave numerical analyzer.

Although Patent Document 1 discloses analyzing waves hitting a breakwater, the invention thereof cannot predict overtopping that occurs in connection with various weather or earthquake phenomena. Further, the disclosed invention merely analyses waves hitting a virtual breakwater, rather than performing simulation in consideration of characteristics of the region. Accordingly, it has many difficulties in predicting the risk of overtopping caused by various factors.

Korean Patent No. 10-2323563 (hereinafter referred to as Patent Document 2) discloses a method for predicting wave overtopping that occurs on a coast, the method including selecting a region for predicting overtopping; acquiring a plurality of first overtopping data items for training an overtopping risk prediction model in the selected region and a plurality of first numerical data items for training the overtopping risk prediction model for at least one of weather or waves; generating the overtopping risk prediction model for predicting the risk of overtopping to occur in the region based on the acquired plurality of first overtopping data items and the plurality of first numerical data items; acquiring first overtopping data for inferring the risk of overtopping in the region and second numerical data for inferring the risk of overtopping for at least one of the weather or the waves; and inferring the risk of overtopping in the region by inputting the first overtopping data and the second numerical data into the generated overtopping risk prediction model.

However, Patent Document 2 fails to provide a alert or countermeasure against the occurrence of overtopping on the coast, and merely discloses simple prediction. Accordingly, further research on damage prevention based on prediction of overtopping is required. In particular, it is difficult to practically use the forecast information predicted through the Patent Document 2 for marine forecasts or special reports from the meteorological administration, unlike detailed forecasts of wave height around ports or breakwaters.

The Fundamental Study for a Wave overtopping Forecast on the East Coast (Department of Atmospheric Environment Information Engineering, Graduate School of Inje University, 2009) (hereinafter referred to as Non-Patent Document 1) is a non-patent document on the study related to defining the progress of overtopping based on the sea state (FIGS. 1 and 2) according to Beaufortscale.

Non-Patent Document 1 suggests setting of new scales of overtopping and criteria therefor as shown in FIG. 3 to address an issue raised as it is difficult to apply Beaufortscale to overtopping in coastal facilities such as revetments and breakwaters.

FIG. 3 is a classification table of a grading of the sea state commonly seen on breakwaters and the progress of overtopping. The state in which the wave height is the most calm is set to scale 1, and the state in which the shape of the breakwater cannot be recognized while the wave completely surrounds the breakwater is set to scale 10. In this way, 10 scales are set for the state of the sea to observe overtopping, and the scale of overtopping is classified based on Beaufortscale.

However, Non-Patent Document 1 presents only limited research results on four breakwaters selected around the maritime forecast zone conducted by the Korea Meteorological Administration, which has a problem of not being able to provide reliability of predictive information on overtopping occurring in various forms depending on the environment of the coastal region.

In addition, only because marine observation equipment for observing overtopping is expensive and difficult to manage, Non-patent Document 1 conducts photographic and visual observations in the vicinity of breakwaters to be studied instead of using mechanical observation values by observation equipment, and classifies the level of overtopping based solely on the results of photographic and visual observations. For this reason, there is a problem in that it is difficult to use the classification as overtopping prediction information for other coastal areas except for the four selected breakwaters.

Wave Overtopping Formula for Impulsive and Non-Impulsive Wave Conditions against Vertical Wall (Korean Coastal and Marine Engineering Society Papers, pp. 175-181, June 2015) (hereinafter referred to as Non-Patent Document 2) discloses that overtopping can affect the utilization of berthing facilities on the backside of breakwaters and revetments and excessive overtopping can adversely affect the constant temperature in the port by generating transmitted waves, and that the amount of overtopping is an important design item that determines the crest height of the structure, and predicting an appropriate amount of overtopping is required.

Non-Patent Document 2 suggests an overtopping amount calculation method limited to upright structures, and in particular, merely provides overtopping experiments on upright structures to which inclined upper concrete is applied. However, it is difficult to apply the suggested method to the coastal areas with various geometries.

In addition, Non-Patent Document 2 cannot present reliable data on the amount of overtopping for structures that have already been constructed, and only presents data on the amount of overtopping before construction for coastal areas to be constructed such that the design of the structure can be made. Therefore, Non-Patent Document 2 is insufficient as measures for predicting damage caused by overtopping which changes over time according to various environments or preventing damage caused by overtopping.

The above-mentioned prior art documents may predict the amount of overtopping during the daytime, i.e., when visibility is secured, but have difficulties in generating information on the status of overtopping, overtopping prediction, and overtopping amount during the nighttime. Therefore, it is difficult to prepare for overtopping occurring at night with the prior art documents.

In addition, if overtopping occurs at night, people such as residents or travelers located near marine structures where overtopping has occurred will suffer damage. Therefore, research should be connected to prevent overtopping.

The background art or prior art described above is only to help understand the technical significance of the present disclosure, and does not imply that it was widely known in the technical field to which the present disclosure belongs prior to the filing of the present application.

PRIOR ART LITERATURE

Patent Documents (Patent Document 1) Korean Patent No. 10-1190321
(Patent Document 2) Korean Patent No. 10-2323563

Non-Patent Literature (Non-Patent Document 1) The Fundamental Study for a Wave overtopping Forecast on the East Coast (Department of Atmospheric Environment Information Engineering, Graduate School of Inje University, 2009)
(Non-Patent Document 2) Wave Overtopping Formula for Impulsive and Non-Impulsive Wave Conditions against Vertical Wall (Korean Coastal and Marine Engineering Society Papers, pp. 175-181, June 2015)

SUMMARY OF THE INVENTION

Therefore, the present disclosure has been made in view of the above problems, and it is an object of the present disclosure to provide an artificial intelligence overtopping prediction device that is installed adjacent to a marine structure and is capable of collecting image information on waves moving toward a marine structure, analyzing the occurrence of high waves toward marine structure in real time, analyzing information on the pressure of waves colliding with the marine structure to identify the possibility of overtopping regardless of the shape of the coastal area and seasonal changes, and analyzing collected information by artificial intelligence to generate reliable prediction information about whether overtopping will occur in the coastal area, and an overtopping prediction system using the same.

It is another object of the present disclosure to provide an artificial intelligence overtopping prediction device capable of collecting and analyzing image information on waves heading around constructed marine structures in coastal areas in real time using a drone to predict overtopping caused by meteorological factors such as wave height, wave direction, wind direction, and wind speed, analyzing the pressure of waves colliding with marine structures to generate overtopping amount information to generate reliable information on presence of overtopping and overtopping prediction information, and accurately determining the degree of overtopping not only during the day but also at night such that damage that may be caused by overtopping may be prevented by predicting the occurrence and risk of overtopping in various forms and allowing people to be quickly prepared for the overtopping, and an overtopping prediction system using the same.

It is another object of the present disclosure to provide an artificial intelligence overtopping prediction device capable of emitting light with a controlled degree of light emission around a marine structure according to the pressure of the waves hitting the marine structure such that the occurrence of overtopping may be recognized even from a far distance, and safety is secured for citizens approaching the marine structure, and an overtopping prediction system using the same.

It is another object of the present disclosure to provide an artificial intelligence overtopping prediction device equipped with a thermal imaging camera and capable of detecting presence of people approaching a breakwater at night, counting people approaching the breakwater to generate information on the number of approaching people such that recording of the entry and exit of people approaching the marine structure is managed, and a life-threatening accident caused by overtopping may be quickly coped with, and an overtopping prediction system using the same.

It is another object of the present disclosure to provide an artificial intelligence overtopping prediction device which has a safety boundary device installed on the floor adjacent to the overtopping prediction device and is configured to emit LED light to form a boundary line for a boundary area where damage may be caused by overtopping when overtopping occurs, such that people may be blocked from entering the area where damage may be caused by overtopping, and thus overtopping may be prevented from causing human casualties, and an overtopping prediction system using the same.

It is another object of the present disclosure to provide an artificial intelligence overtopping prediction device capable of generating overtopping prediction information and overtopping amount information to predict overtopping regardless of the shape of the coastal area as the overtopping prediction device can be installed even with a constructed marine structure being present, and an overtopping prediction system using the same.

It is another object of the present disclosure to provide an artificial intelligence overtopping prediction device capable of significantly reducing the risk of an accident caused by overtopping by alerting people in the vicinity to the occurrence of overtopping through a visual signaling device attached to the overtopping prediction device when overtopping is expected based on the overtopping prediction information analyzed by the overtopping prediction device, and an overtopping prediction system using the same.

The objects of the present disclosure are not limited to the objects mentioned above, and may include an object or an effect that may be understood from the solution or embodiments even if not explicitly mentioned.

The present disclosure provides a visual signaling device capable of minimize damage caused by overtopping by enabling a drone to fly to guide residents living around a marine structure to prepare for overtopping by transmitting overtopping occurrence information in real time when overtopping is expected.

The visual signaling device generates power and a motion signal through piezoelectric power generated through the weight of waves applied by overtopping, and guides users to safety zones by analyzing user images monitored through CCTV installed on breakwaters, etc. with AI.

In accordance with an aspect of the present disclosure, the above and other objects can be accomplished by the provision of an artificial intelligence overtopping prediction device including a first pressure measurement part 103 configured to generate wave pressure information by measuring a collision pressure of waves colliding with a marine structure 10 and transmit the generated wave pressure information, a second pressure measurement part 105 configured to measure an overtopping amount of waves flowing over the marine structure 10 into a road surface 20 and transmit information about the measured overtopping amount of the waves, an overtopping alert part 109 configured to collect images of surroundings around the overtopping prediction device 100 and output an alert sound when overtopping occurs to evacuate people, an information collection and control part 107 including a drone storage 170 configured to allow the drone 202 to fly and configured to collect image information about people or sea surfaces around the overtopping prediction device 100 through the drone 202 and to provide a remote alert when the overtopping occurs, and a collection controller 160 configured to control driving of the overtopping prediction device 100, receive and store the wave pressure information and the overtopping amount information about the waves, and transmit the wave pressure information and the overtopping amount information about the waves to an overtopping prediction system 500 to predict occurrence of the overtopping and generate overtopping prediction information, and a frame part 101 having a lower end buried in the marine structure 10, the frame part 101 including a support frame 110 allowing the first and second pressure measurement parts 103 and 105, the information collection and control part 107, and the overtopping alert part 109 to be respectively mounted thereon.

The support frame 110 may include a buried frame 112 buried in the road surface 20, a lower support frame 114 coupled to an upper portion of the buried frame 112 so as to be lifted and lowered, the lower support frame 114 allowing the information collection and control part 107 to be mounted thereon, an upper support frame 116 having an alert part lifting housing 117 coupled to an upper end thereof to adjust a height of the overtopping alert part 109, an alert part lifting frame 118 coupled to the alert part lifting housing 117 and having an overtopping alert part 109 mounted on an upper end thereof to adjust the height of the overtopping alert part 109 according to whether the alert part lifting housing 117 is driven, a first connector 340 provided in the buried frame 112 and configured to connect the first pressure measurement part 103 and the information collection and control part 107, a second connector 350 provided in the lower support frame 114 and configured to connect the second pressure measurement part 105 and the information collection and control part 107.

The buried frame 112 may further include a prop frame 310 coupled to a lower end of the buried frame 112 and configured to improve coupling between the buried frame 112 and the road surface 20.

The lower support frame 114 further includes a support frame lifting operation part 115 including a lifting rotation means 115a connected to the information collection and control part 107 and coupled to an upper end of the lower support frame 114, and a lifting gear member 115*b* arranged on one surface of the lower support frame 114 and driven by the lifting rotation means 115*a* to lift or lower the lower support frame 114.

The first pressure measurement part 103 may include a first measurement module 130 configured to generate the wave pressure information by measuring the collision pressure of the waves colliding with the marine structure 10 and transmit the generated wave pressure information to the information collection and control part 107, and a first measurement part 120 configured to support the first measurement module 130 to be coupled to the marine structure 10 at the same inclination angle as the marine structure 10.

The first measurement module 130 may include a first shock absorbing member 132 seated on a bottom surface of the first measurement part 120 and configured to absorb a shock of wave pressure transmitted to the first measurement module 130, a first sensor connector 134 configured to transmit information on the collision pressure of the waves measured by the first measurement module 130, a first measurement module controller 136 configured to receive the information on the collision pressure of the waves, generate wave pressure information, and transmit the generated wave pressure information to the information collection and control part 107.

The first measurement part 120 may include a first measurement body 122 configured to receive the first measurement module 130 inserted thereinto and couple the first measurement module 130 to the marine structure 10, a first connection body 124 configured to adjust an inclination angle of the first measurement body 122 and connect the first measurement body 122 to the frame part 101, and a measurement angle adjusting means (360) provided in the first connection body 124 and configured to adjust inclination angles of the first measurement part 120 and the first measurement module 130 under control of the first measurement module controller 136.

The first measurement body 122 may include a first protective panel 126 configured to protect the first measurement module 130, a first waterproof member 125 configured to seal a gap between the first measurement body 122 and the first protective panel 126, a first shock transmission member 128 coupled to a rear portion of the first protective panel 126 and configured to transmit the collision pressure of the waves to the first measurement module 130.

The second pressure measurement part 105 may include a second measurement module 150 configured to measure a collision pressure of the waves flowing over the marine structure 10 to the road surface 20 and transmit information on the measured collision pressure of the waves, and a second measurement part 140 including a second measurement body 142 having the second measurement module 150 mounted thereon so as to be installed on the road surface 20, and a second connection body 144 configured to connect the second measurement body 142 and the frame part 101.

The overtopping alert part 109 may include a first image capture means 182 configured to capture and collect images of the surroundings around the overtopping prediction device 100 and transmit the collected images of the surroundings to the collection controller 160, a second image capture means 184 selectively driven according to the overtopping prediction information and configured to provide information on persons located around the overtopping prediction device 100, a warning sound output module 186 configured to transmit an alert sound to the surroundings around the overtopping prediction device 100 to evacuate people when overtopping occurs, a lighting means 188 configured to provide predetermined light to the first and second pressure measurement parts 103 and 105 such that information on the collision pressure and overtopping amount of the waves is collected even at night, and an alert information module 190 configured to deliver a warning message according to the occurrence of the overtopping to people moving toward the overtopping prediction device 100.

The drone storage 170 may include a drone accommodation part 204 configured to allow the drone 202 to take off and land, an opening and closing door 172 provided on one surface of the drone accommodation part 204 to open and close the drone accommodation part 204, a sealing frame 174 configured to provide a sealing force during a closing operation of the opening and closing door 172, a locking means 176 configured to be set in a locked mode to prevent the opening and closing door 172 from being opened, and a temperature and humidity controller 178 configured to control a temperature and humidity of the drone accommodation part 204.

The collection controller 160 may analyze image information about people transmitted from the overtopping alert part 109, generate counting information by counting the people in real time, and transmit the generated counting information to the overtopping prediction system 500.

The collection controller 160 may be configured to compare the collision pressure information about the overtopping transmitted from the second pressure measurement part 105 with pre-stored overtopping level information, determine a risk level of the overtopping occurring in a corresponding area, and control an intensity of light of an LED provided in the overtopping alert part 109 according to the determined risk level of the overtopping.

The collection controller 160 may set a boundary area for a danger zone according to the occurrence of the overtopping by causing the light of the LED to be emitting onto the road surface 20 according to the risk level of the overtopping.

In accordance with another aspect of the present disclosure, provided is an overtopping prediction system 500 using the overtopping prediction device 100, the overtopping prediction system 500 including a wave information collector 510 configured to receive wave pressure information and information about a collision pressure of overtopping transmitted through the information collection and control part 107 and transmit the same, and operate in connection with the drone 202 to receive image information about a state of a sea surface captured by the drone 202, a collected information analyzer 520 configured to analyze the information collected by the wave information collector 510 and generate overtopping amount information about an area where the overtopping prediction device 100 is installed, a prediction information generator 530 configured to generate overtopping prediction information about the area based on the overtopping amount information generated by the collected information analyzer 520, a condition value setting part 540 configured to generate overtopping level information to enable the prediction information generator 530 to generate the overtopping prediction information, and transmit the generated overtopping level information to the prediction information generator 530 and the information collection and control part 107, a drone linkage part 550 configured to collect information about whether the drone 202 is flying and image information about a sea surface at a location outside a predetermined range from the marine structure 10 and transmit the same to the collected information analyzer 520, a database 560 configured to store collected wave and overtopping image information, wave and overtopping pressure information, the overtopping amount information, the overtopping prediction information, and the overtopping level information, wherein the overtopping amount information, the overtopping prediction information, and the overtopping level information correspond to a result of analysis of the wave and overtopping image information and the wave and overtopping pressure information, and a prediction controller 570 connected to the information collection and control part 107 over a network to control driving of the overtopping prediction system 500, the prediction controller 570 being configured to sharing the information stored in the database 560 with the information collection and control part 107.

The collected information analyzer 520 may analyze the wave pressure information measured by the first pressure measurement part 103 to generate overtopping amount information by converting the wave pressure into an overtopping amount per unit area, and transmit the generated overtopping amount information to the prediction information generator 530 to generate the overtopping prediction information.

The collected information analyzer 520 may analyze the information about the collision pressure of the overtopping measured by the second pressure measurement part 105 to generate overtopping amount information by converting the collision pressure of the overtopping into an overtopping amount per unit area, and transmit the generated overtopping amount information to the prediction information generator 530 to generate the overtopping prediction information.

The collected information analyzer 520 may be configured to compare the overtopping level information provided by the condition value setting part 540 with the overtopping amount information computed by converting the wave pressure information, and transmit overtopping amount information corresponding to the wave pressure information to the prediction information generator 530 only when it is determined that the overtopping amount information corresponds to a level of overtopping likely to collide with the second pressure measurement part 105.

The collected information analyzer 520 may be configured to monitor, in real time, wave image information transmitted from the overtopping prediction device 100, and transmit the wave image information monitored in real time to the database 560 so as to be stored in the database 560 in an accumulated manner.

In generating the overtopping prediction information, the prediction information generator 530 may be configured to generating overtopping occurrence time information about a time when overtopping will occur, when it is predicted that overtopping of a predetermined level or higher will occur in the area, generate an overtopping alert signal, and generate overtopping occurrence cycle prediction information about an overtopping occurrence cycle by analyzing the stored real-time monitored information through the collection information analyzer 520.

The condition value setting part 540 may be configured to analyze the image information of the sea surface captured by the drone 202, and analyze, through comparison, information on a height (wave) of the sea surface, an arrival time when the sea surface reaches to collide with the first pressure measurement part 103, and information about an amount of overtopping occurring according to the collision, and generate overtopping level information based on a result of the analysis and store the same in the database 560 to allow the prediction information generator 530 to generate the overtopping prediction information.

When the overtopping prediction information includes the overtopping occurrence alert signal, the prediction controller 570 may make a request to the information collection and control part 107 for real-time changing data of counting information related to image information about people located around the overtopping prediction device 100, check whether the real-time changing data is changed, and transmit a control signal for driving of the overtopping alert part 109 to the information collection and control part 107.

BRIEF DESCRIPTION OF THE DRAWINGS

The above and other objects, features and other advantages of the present disclosure will be more clearly understood from the following detailed description taken in conjunction with the accompanying drawings, in which:

FIGS. 1 and 2 are a table of grading showing the scale of sea conditions according to Beaufortscale according to the prior art;

FIG. 3 is a table of grading showing the states of the sea and overtopping levels that are newly set according to the prior art;

DETAILED DESCRIPTION OF THE INVENTION

Figure 4:
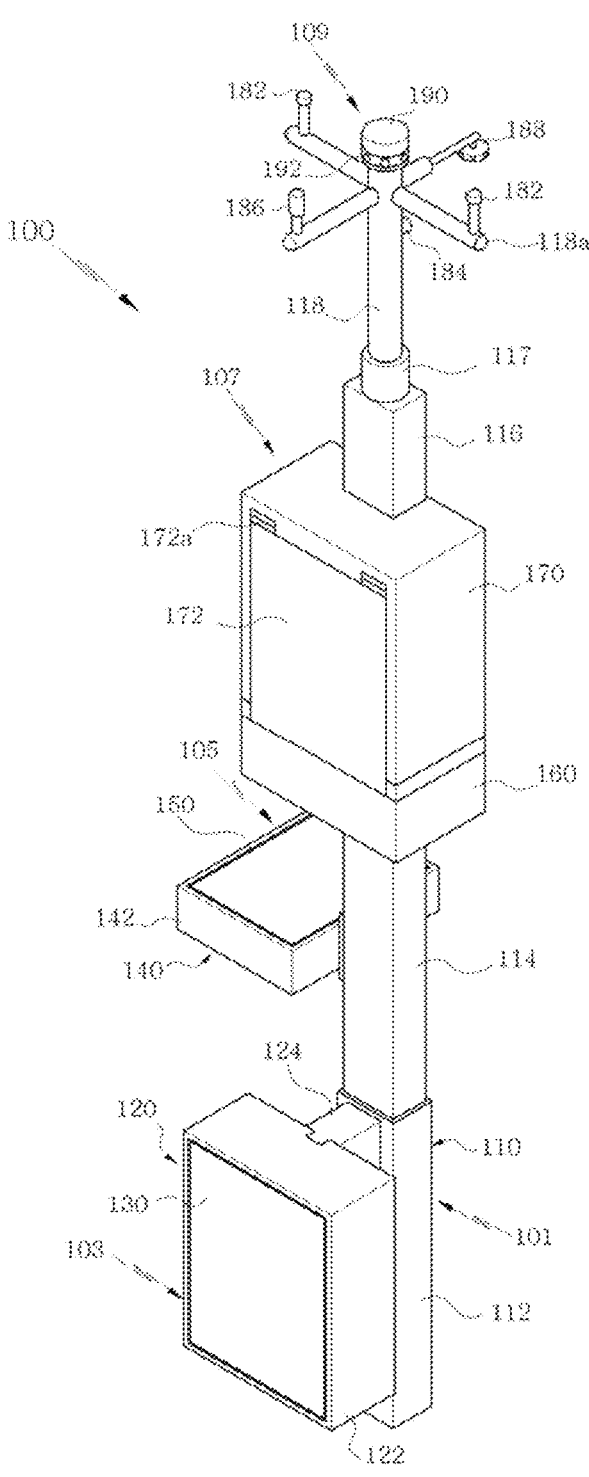
FIG. 4 is a perspective view showing an artificial intelligence overtopping prediction device according to an embodiment of the present disclosure.

Hereinafter, preferred embodiments of the present disclosure will be described in detail with reference to the accompanying drawings. It should be noted that, in assigning reference numerals to the constituent elements in the respective drawings, the same reference numbers will be used throughout the drawings to refer to the same or like elements. Further, in describing the present disclosure, a detailed description of known functions and configurations incorporated herein will be omitted to avoid obscuring the subject matter of the embodiments.

The terms "include," "comprise" and "have" should be understood as not precluding the possibility of existence or addition of one or more other components unless otherwise stated. All terms, including technical and scientific terms, have the same meaning as commonly understood by one of ordinary skill in the art to which this disclosure pertains, unless otherwise defined. Various terms such as first, second, A, B, (a), (b), etc., are used solely for the purpose of differentiating one component from the other, but neither imply nor suggest the substances, order or sequence of the components. When a component is described as being "connected," "coupled," or "attached" to another component, it is to be understood that the component may be directly connected or attached to the other component, but that there may be other components "connected," "coupled," or "attached" between the respective components.

In addition, the term "module" or "part" as used herein refers to a software or hardware component, but is not limited to software or hardware. A "module" or "part" may be configured to reside on an addressable storage medium, may be configured to reproduce one or at least two processors, and may include at least one of the following components: software components, object-oriented software components, class components, task components; processes, functions, attributes, procedures, subroutines, segments of program code, drivers, firmware, microcode, circuits, data, databases, data structures, tables, arrays, or variables.

Furthermore, the "modules" or "parts" described in the present disclosure may be implemented with processors and memory. The term "processor" should be broadly construed to include general purpose processors, central processing units (CPUs), microprocessors, digital signal processors (DSPs), controllers, microcontrollers, and state machines, and may also refer to a combination of processing devices, such as, for example, a combination of a DSP and a microprocessor, a combination of a plurality of microprocessors, a combination of one or more microprocessors coupled with a DSP core, or any other such configuration.

Further, "memory" should be interpreted broadly to include any electronic component capable of storing electronic information. "Memory" may also refer to various types of processor-readable media, such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, and registers.

Further, in one embodiment of the present disclosure, components and "modules" or "parts" may be combined into fewer components and "modules" or "parts" or further separated into additional components and "modules" or "parts" with functionality provided therein.

As used herein, the term overtopping may refer to a wave or waves that may be generated upon collision with a marine structure, such as a dike, railing, or breakwater along a coast, and that flow over the top of the coastal structure.

Hereinafter, embodiments of the present disclosure will be described in detail with reference to the accompanying drawings.

As shown in FIGS. 4 to 14, an artificial intelligence overtopping prediction device 100 of the present disclosure is installed on top of a marine structure 10 such as a breakwater, and is configured to analyze image information about waves heading toward the marine structure 10 and the collision pressure of the waves colliding with the marine structure 10 to determine whether overtopping has occurred in the corresponding area and to prevent the overtopping from causing damage when overtopping occurs. The artificial intelligence overtopping prediction device 100 includes a frame part 101, a first pressure measurement part 103, a second pressure measurement part 105, an information collection and control part 107, and an overtopping alert part 109.

The frame portion 101 may comprise a support frame 110 formed in a rectangular column shape and buried in the maritime offshore structure 10 to allow the overtopping prediction device 100 to be stably installed, while providing support for the operation of the overtopping prediction.

The support frame 110 serves as a support, supports the device such that the device can be installed on the road surface 20 formed on the marine structure 10, and supports each component for predicting overtopping, that is, the first pressure measurement part 103, the second pressure measurement part 105, the information collection and control part 107, and the overtopping alert part 109 such that the components may be mounted.

The support frame 110 includes an buried frame 112 buried in the road surface 20, a lower support frame 114 coupled to an upper portion of the buried frame 112 so as to be liftable and allowing the information collection and control part 107 to be mounted at an upper end thereof. And configured to mount the control unit 107 and an upper part connected to a center of an upper end of the information collection and control part 107 and configured to support a height of the overtopping alert part 109 so as to be adjustable, an alert part lifting housing 117 coupled to an upper end of the upper support frame 116 and driven to adjust the height of the overtopping alert part 109 under control of the information collection and control part 107, and an alert part lifting frame 118 coupled to the alert part lifting housing 117 with the overtopping alert part 109 mounted on an upper end thereof to adjust the height of the overtopping alert part 109 depending on whether the alert part lifting housing 117 is driven.

Figure 5:
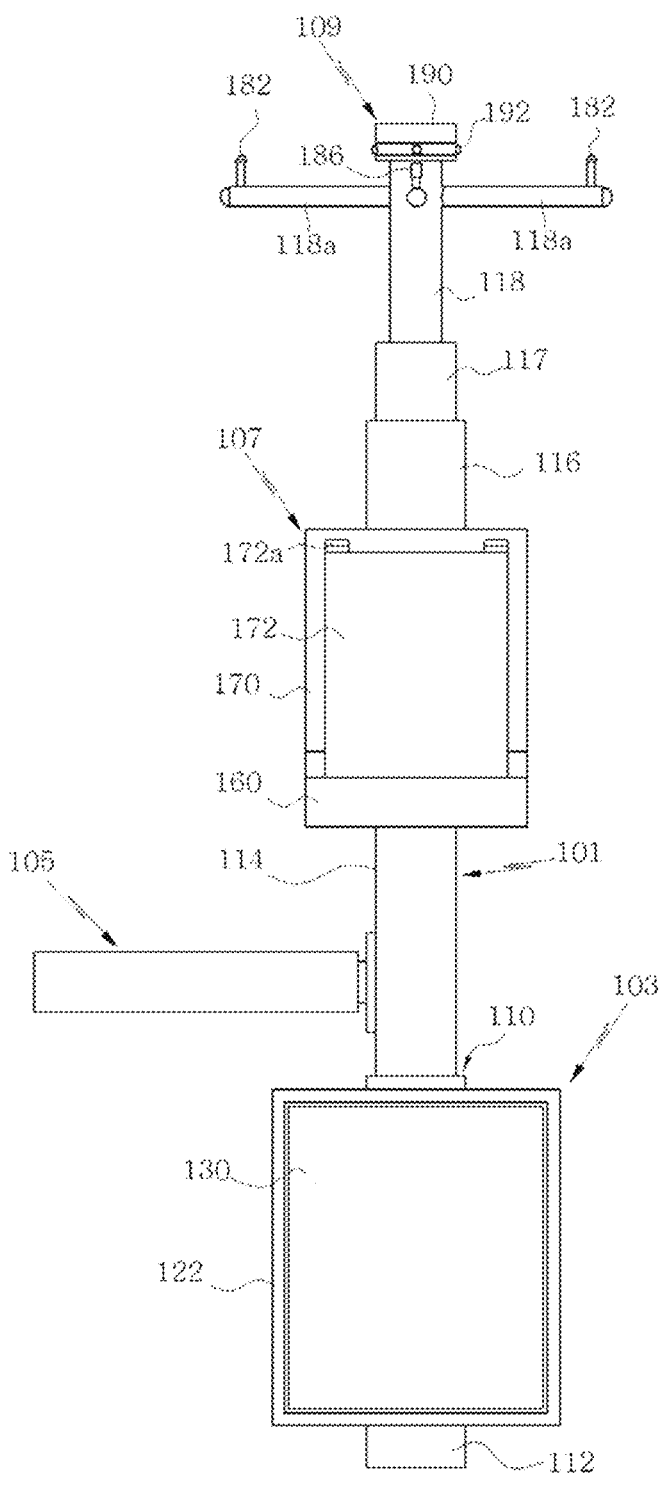
FIG. 5 is a front view showing the artificial intelligence overtopping prediction device according to the embodiment of the present disclosure.

Here, as shown in FIGS. 4 and 5, the buried frame 112 is coupled with the first pressure measurement part 103 arranged in front thereof. When the buried frame 112 is buried in the road surface 20, it is connected to the first pressure measurement part 103, which is exposed to the outside the marine structure 10.

The buried frame 112 has a first connector 340 embedded therein for electrical connection between the information collection and control part 107 and the first pressure measurement part 103 when the buried frame 112 is connected to the first pressure measurement part 103.

The first connector 340 is connected to a communication cable, a power cable, or the like provided from the information collection and control part 107. The communication cable and the power cable are connected to the first measurement part 120 configured in the first pressure measurement part 103 such that the first measurement module 130 configured in the first pressure measurement part 103 is connected to the collection controller 160 of the information collection and control part 107 and that the first pressure measurement part 103 is driven under control of the collection controller 160.

The first connector 340 may have a built-in cable connector to which the communication cable and the power cable are connected, and may further include a connection terminal module 342 provided on one side thereof to be electrically connected to a first connection body 124 configured in the first measurement part 120 to one side. However, embodiments are not limited thereto.

Also, the first connector 340 includes a lower control tube 334 allowing the communication cable and the power cable to be embedded through an upper central portion thereof, and configured to prevent salt contained in seawater from penetrating into the communication cable and the power cable.

The lower control tube 334 may include a plurality of hollow tubes configured to perform a lifting operation when the lower support frame 114 is moved up and down.

However, embodiments are not limited thereto, and the lower control tube may be configured as a typical bellows type pipe.

The buried frame 112 may be provided with an interior member 320 that prevents external contaminants such as salt introduced therein from causing errors in data transmission and reception through network communication.

The interior member 320 may be formed of a material capable of absorbing salt or moisture containing salt, and may be arranged to surround the first connector 340 and the lower control tube 334.

The interior member 320 may be configured to be coupled in the same shape as the second connector 350 and the lower control tube 332, which will be described later.

Figure 6:
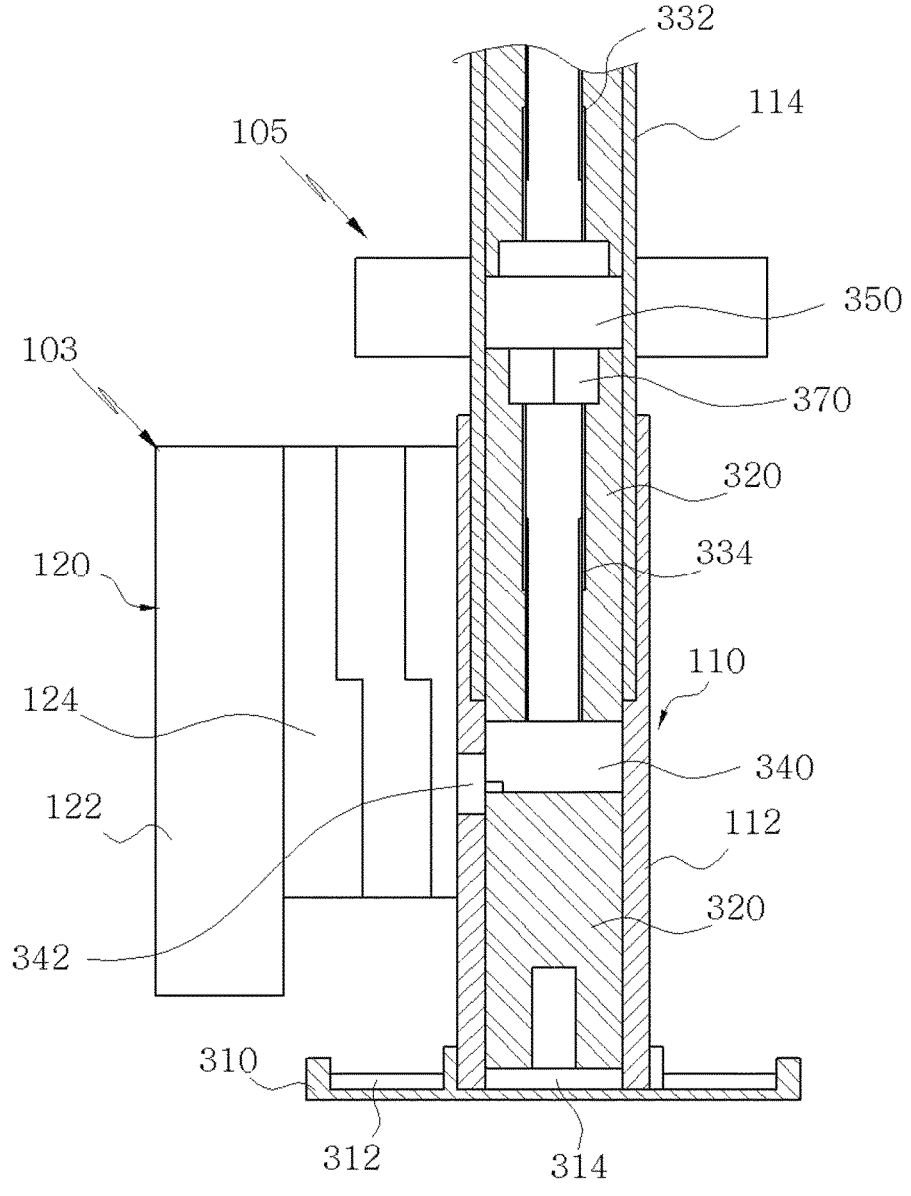
FIG. 6 is a view showing the lower internal structure of a frame part of the artificial intelligence overtopping prediction device according to an embodiment of the present disclosure.
Figure 7:
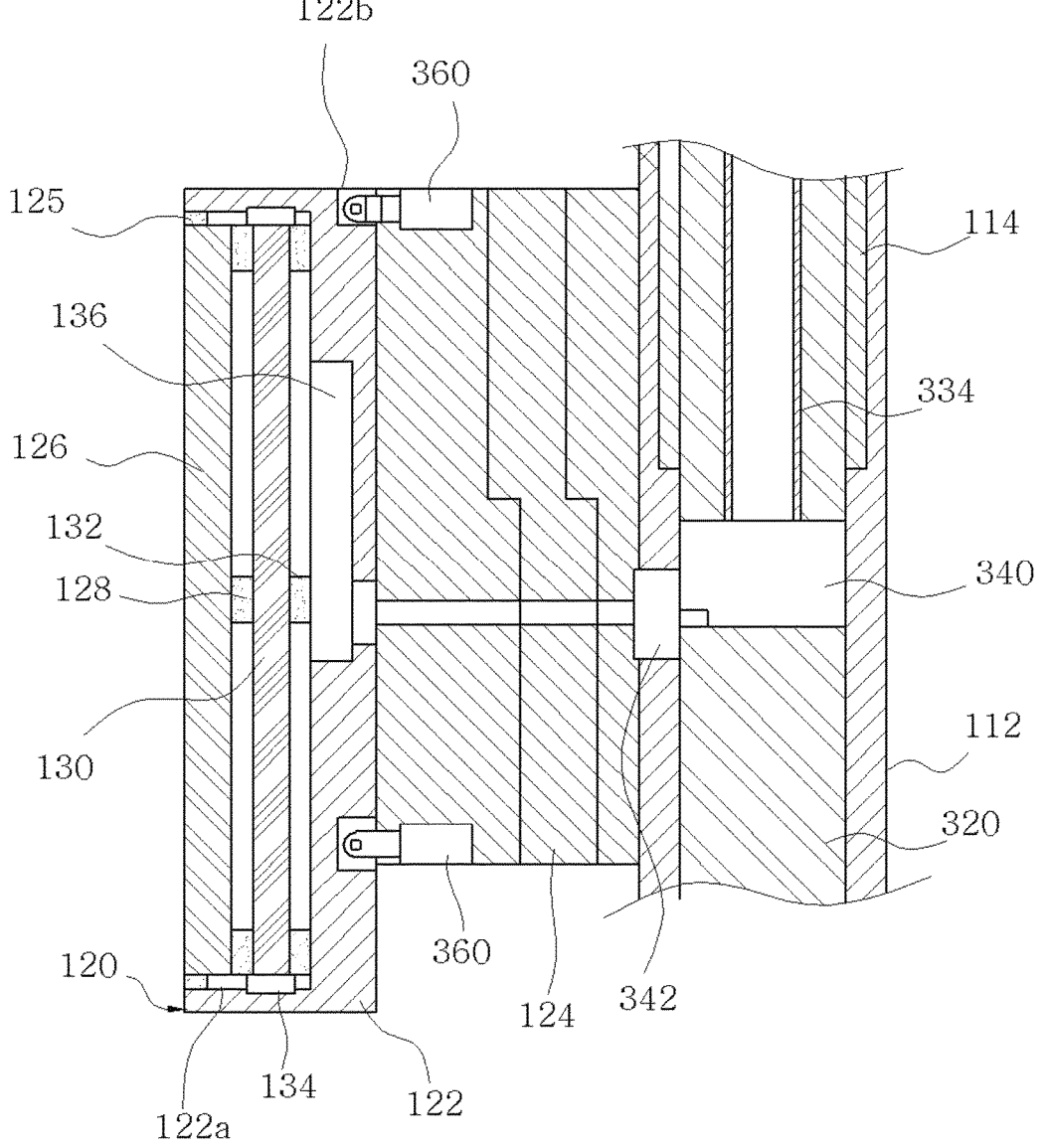
FIG. 7 is a view showing a first pressure measurement part of the artificial intelligence overtopping prediction device according to an embodiment of the present disclosure.
Figure 8:
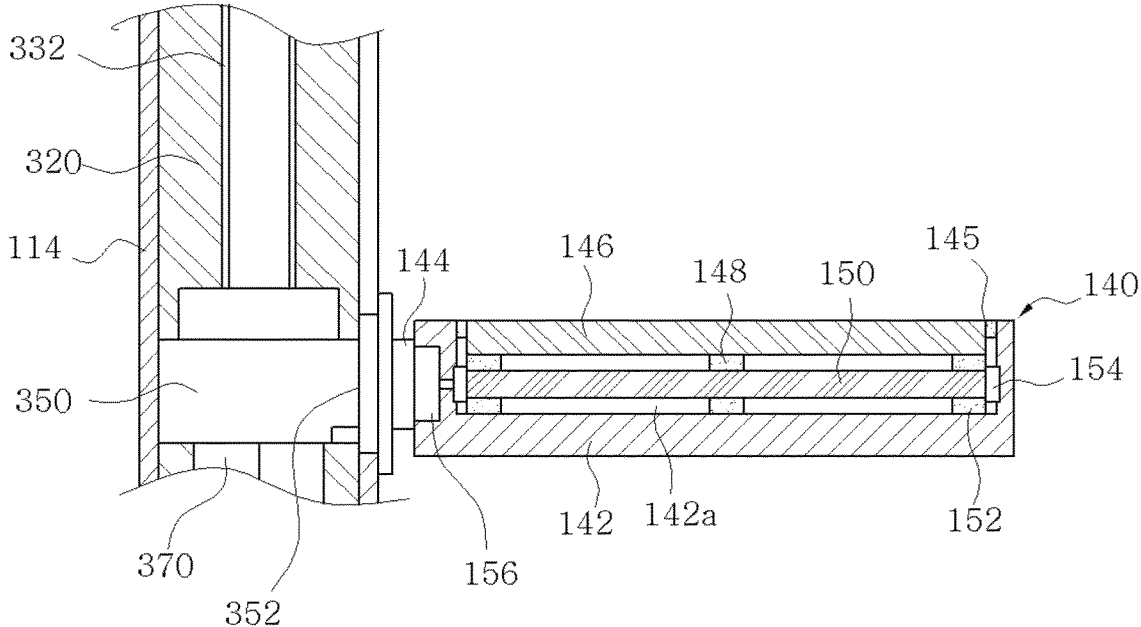
FIG. 8 is a view showing a second pressure measurement part of the artificial intelligence overtopping prediction device according to an embodiment of the present disclosure.
Figure 9:
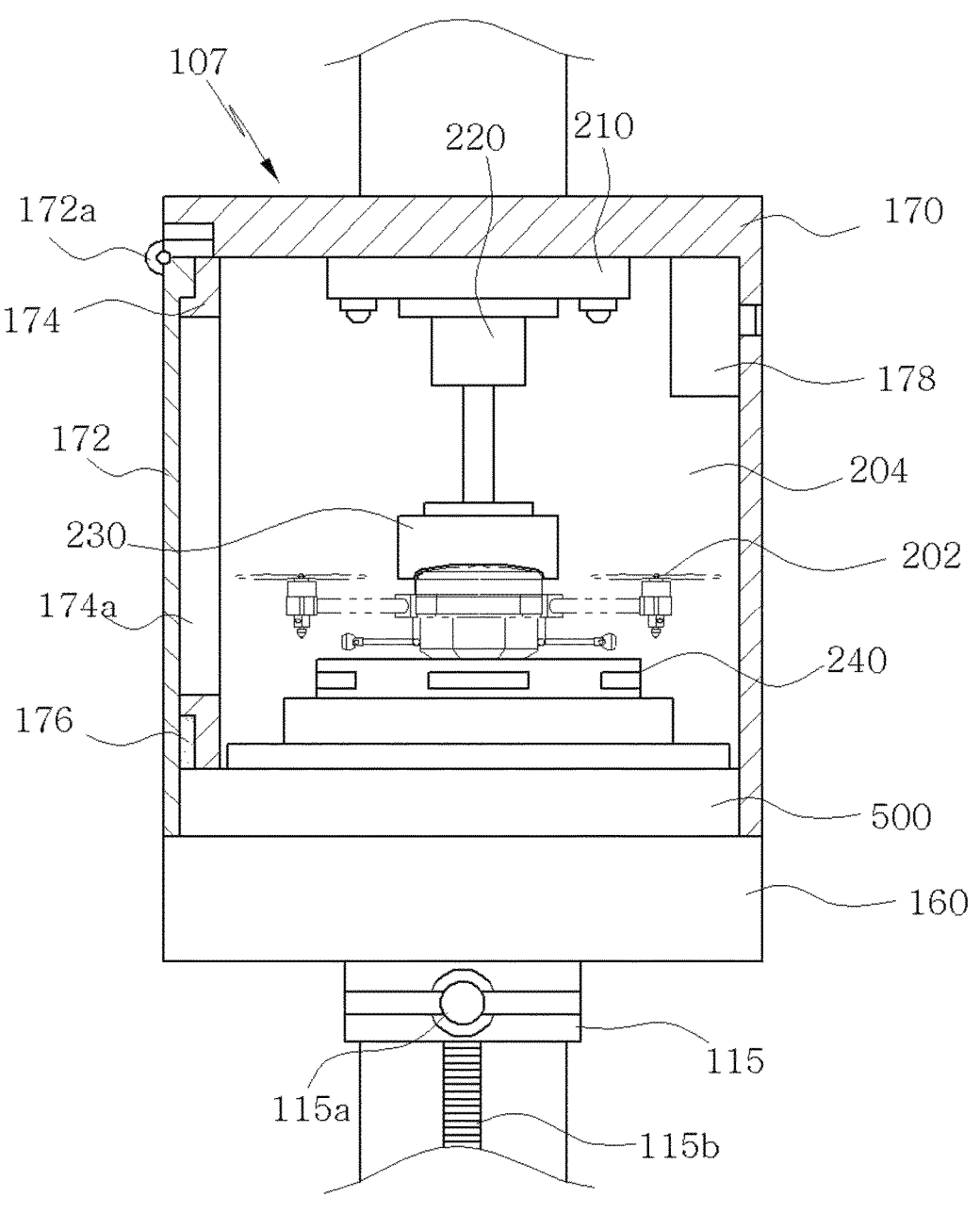
FIG. 9 is a view showing an information collection and control part of the artificial intelligence overtopping prediction device according to an embodiment of the present disclosure.
Figure 10:
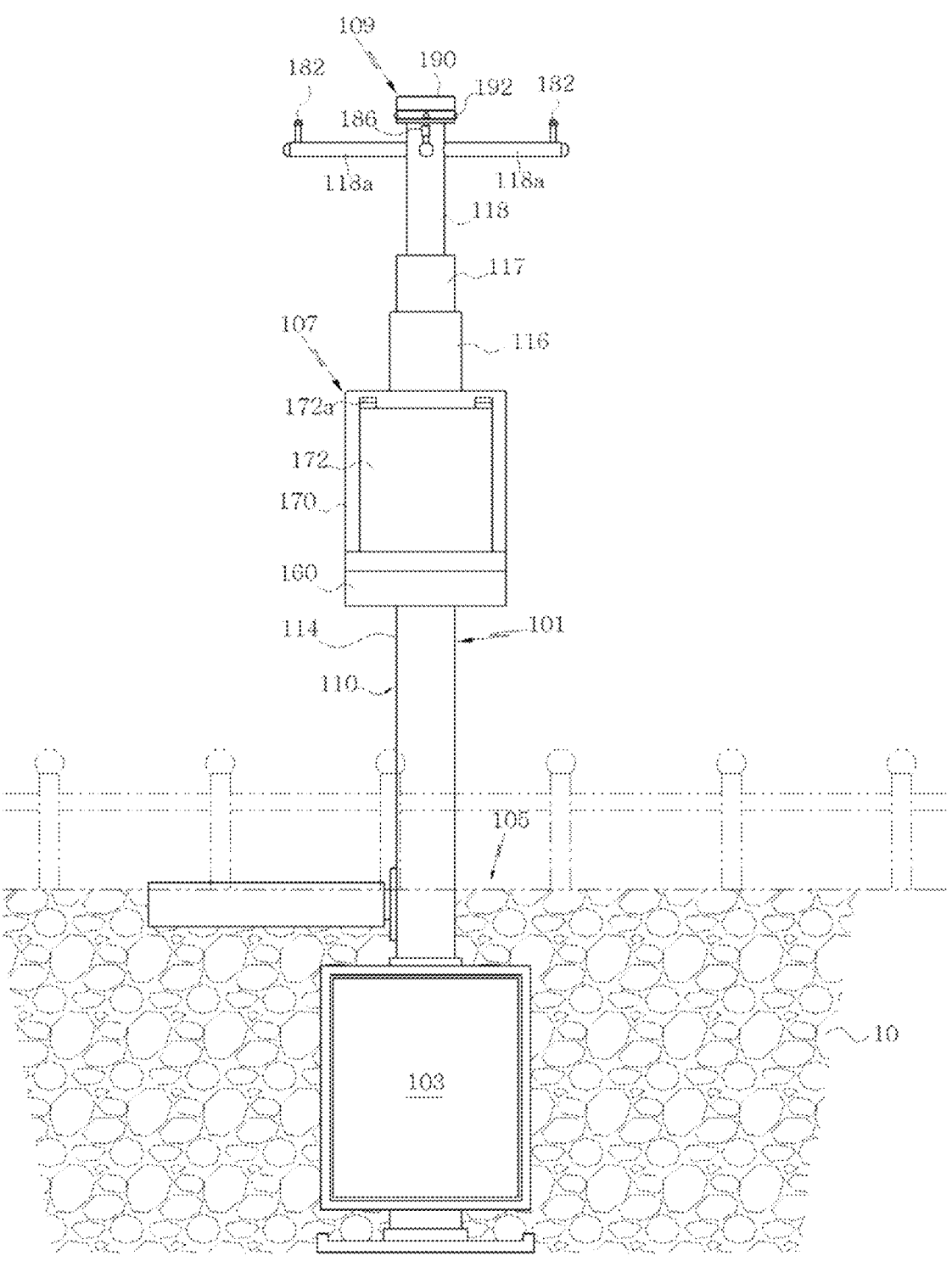
FIGS. 10 to 12 are views schematically showing the artificial intelligence overtopping predictor installed in a place according to an embodiment of the present disclosure.
Figure 11:
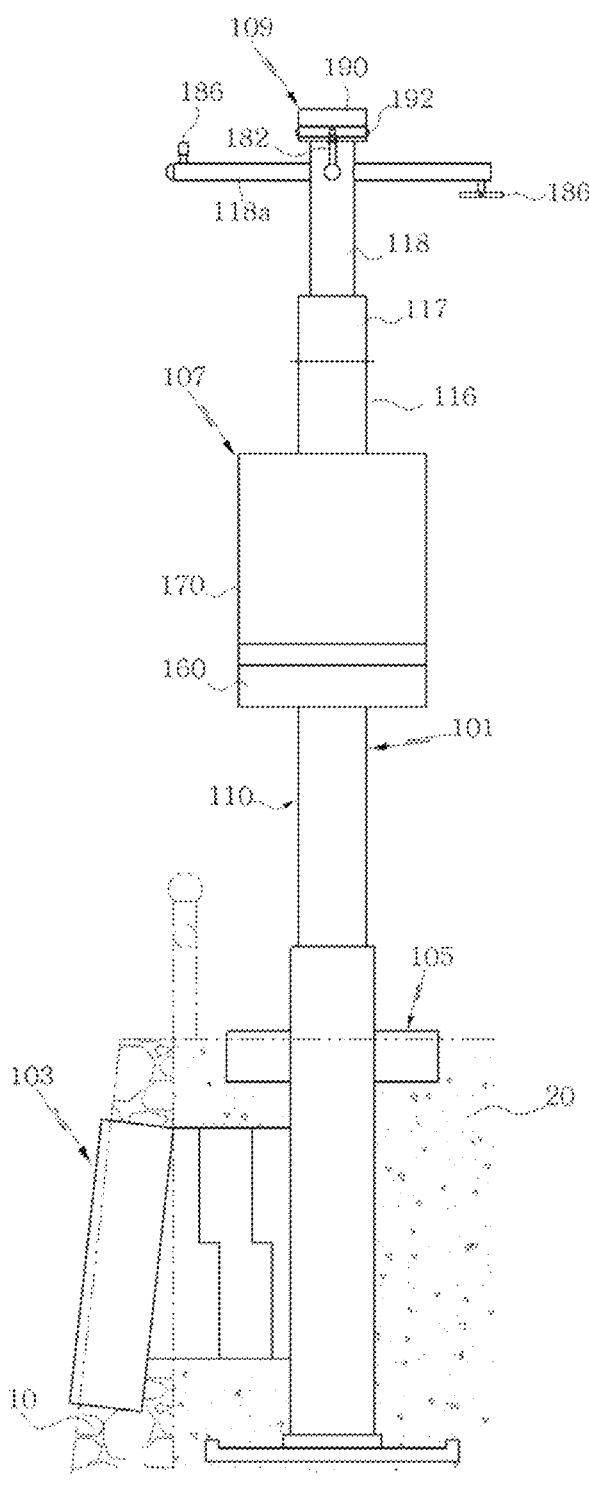
Figure 12:
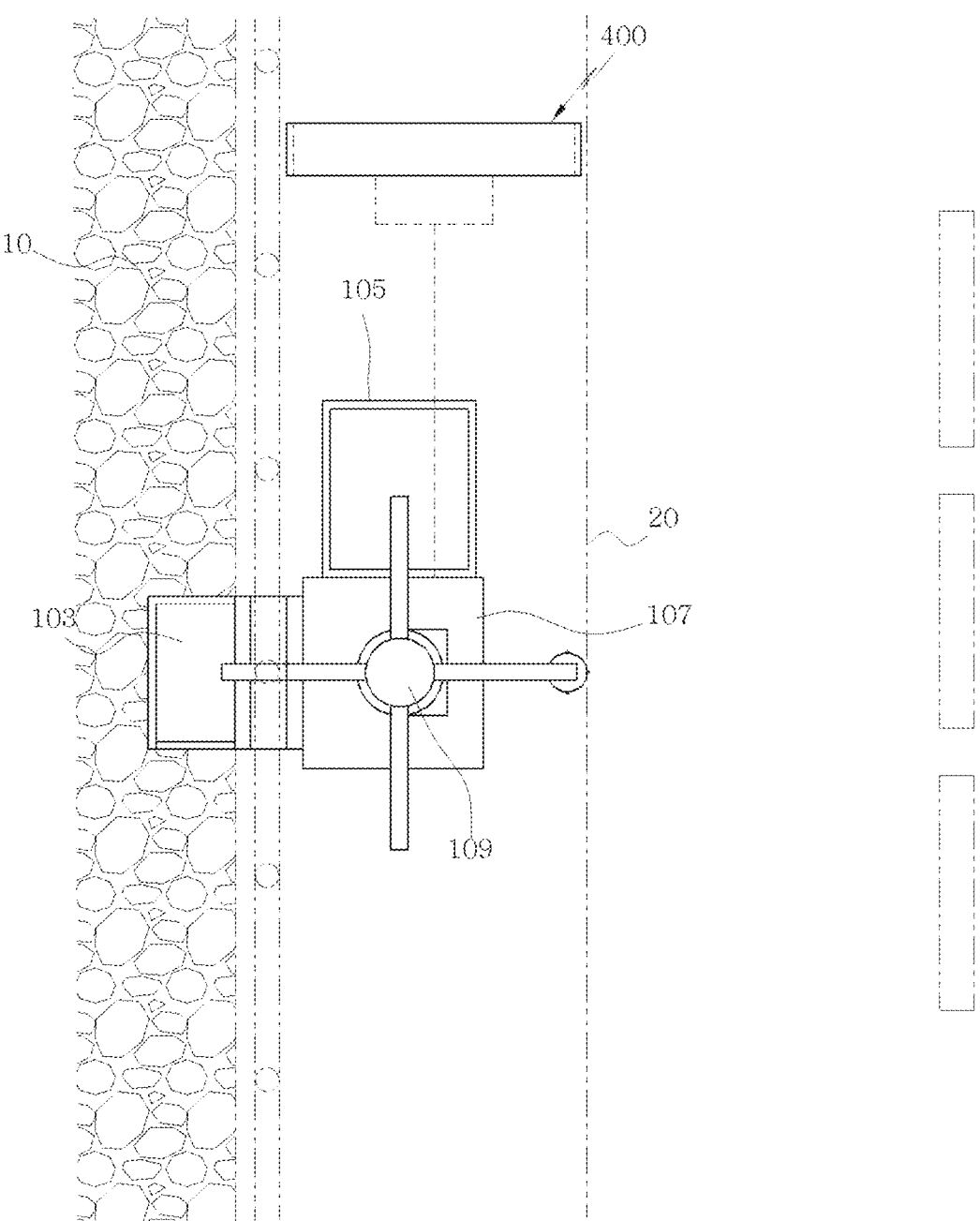
Figures 13, 14:
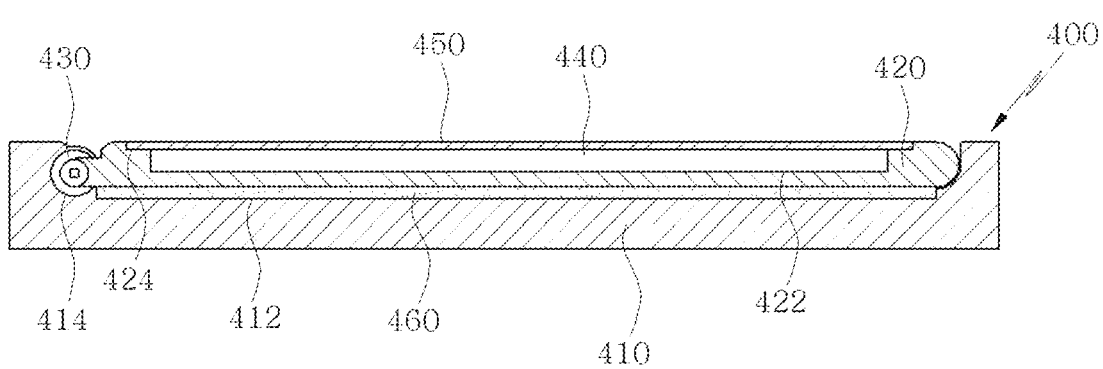
FIGS. 13 and 14 are views showing an entry blocking assembly of the artificial intelligence overtopping prediction device according to an embodiment of the present disclosure.

As shown in FIG. 6, the buried frame 112 of the present disclosure may include a prop frame 310 detachably coupled to the lower end thereof to seal the inside of the buried frame 112. The prop frame 310 is closely coupled with the buried frame 112 and the filling materials defining the road surface 20. It may ensure that the buried frame 112, that is, the support frame 110 is stably fixed on the road surface 20, and prevent the overtopping prediction device 100 from being forcibly separated from the road surface 20 by overtopping.

The prop frame 310 may be configured as a rectangular or circular frame, and provided with a buried frame fixing flange such that the lower end of the buried frame 112 may be inserted and fixed to the center of the prop frame.

In addition, the prop frame 310 includes a filling groove 312 configured to enhance binding between the prop frame 310 and the filling materials of the road surface 20 as the filling materials defining the road surface 20 are introduced into the space outside the buried frame fixing flange, such that the prop frame 310, such that the buried frame 112 is more securely fixed to the prop frame 310, and a frame fixing member 314 provided to the buried frame fixing flange and coupled to the buried frame 112 inserted and fixed to the prop frame 310 such that the prop frame 310 and the buried frame 112 may be closely fixed and supported.

Here, the filling groove 312 may include multiple filling grooves spaced apart from each other along a top surface of the prop frame 310 by a predetermined distance. The filling grooves may be spaced apart from each other by a constant distance.

In addition, a binding member may be further configured in the filling groove 312 to improve binding with the filling materials. The binding member may be formed of a mesh whose surface is coated with an adhesive means, but is not limited thereto.

The frame fixing member 314 may be coupled with the interior member 320 buried in the lower portion of the buried frame 112 in a screw-coupling manner, but is not limited thereto. A screw-coupling flange to which the frame fixing member 314 is screw-coupled may be provided to the bottom surface of the interior member 320 such that the frame fixing member 314 and the interior member 320 are securely coupled to each other.

The frame fixing member 314 may be a typical bolt integrally formed on the bottom surface of the buried frame fixing flange, but is not limited thereto. If a tighter coupling between the support frame 310 and the buried frame 112 is possible, the coupling may be achieved through a variety of different coupling methods.

The communication cable and the power cable inside the lower support frame 114 are connected between the second pressure measurement part 105 and the collection controller 160 of the information collection and control part 107 to guide transmission and reception of a measured value of a shock pressure of a wave measured through the second pressure measurement part 105. The second pressure measurement part 105 is coupled to and supported by one surface of the lower support frame 114 such that the positional adjustment may be performed for the height of the second pressure measurement part 105.

The lower outer surface of the lower support frame 114 is closely coupled to the upper inner surface of the buried frame 112, and the upper end thereof is coupled to the support frame lifting operation part 115 such that the lower support frame 114 is driven by the support frame lifting operation part 115 to move up and down along the inner surface of the buried frame 112.

Here, the support frame lifting operation part 115 is arranged on a rear side bottom surface of a drone storage 170, which will be described later, and provided therein with a rotation device configured to rotate under control of the collection controller 160 of the information collection and control part 107. The support frame lifting operation part 115 includes a lifting rotation means 115a connected to an upper end of the lower support frame 114, and a lifting gear member 115b provided on one surface of the lower support frame 114 and connected to the rotation device to lift and lower the lower support frame 114 while converting rotational force of the rotation device into rectilinear motion.

However, embodiments are not limited thereto. The support frame lifting operation part 115 may be configured to perform lifting and lowering operations by engagement of a plurality of gears, or may be implemented through mechanical coupling structures such as belts and pulleys, as well as devices such as hydraulic and pneumatic cylinders or an actuator.

A support frame lifting guide configured to guide the lifting operation of the lower support frame 114 may be further provided on the inner surface of the upper side of the buried frame 112 described above.

The support frame lifting guide may be performed in the shape of a predetermined groove, and may be provided with a step at the distal end of the lower end side such that the lower end of the lower support frame 114 is seated.

In addition, the second connector 350 is embedded in the lower support frame 114, such that the information collection and control part 107 and the second pressure measurement part 105 may be electrically connected when connection with the second pressure measurement part 105 is established.

Like the first connector 340, the second connector 350 is connected to a communication cable, a power cable, or the like provided from the information collection and control part 107. The communication cable and the power cable are connected to to the second measurement part 140 configured in the second pressure measurement part 105 such that the second measurement module 150 configured in the second pressure measurement part 105 is connected to the collection controller 160.

The second connector 350 may have a built-in cable connector to which the communication cable and the power cable are connected. The second connector 350 includes a connection terminal module 352 arranged on one side for electrical connection with the second connection body 144 configured in the second measurement part 140, and an upper control tube 332 embedded to prevent salt contained in seawater from penetrating into the communication cable and the power cable side.

Here, the upper control tube 332 has the same shape as the lower control tube 334. Also, the lower end of the upper control tube 332 is connected to the second connector 350 and the upper end of the upper control tube 332 is connected to the collection controller 160.

A measurement module position adjusting member 370 to adjust the height of the second measurement part 140 and the second measurement module 150 configured in the second pressure measurement part 105 may be further provided under the second connector 350.

The measurement module position adjusting member 370 may be composed of a typical actuator or a cylinder member. As the measurement module position adjusting member 370 is moved up and down under control of the collection controller 160, it may adjust the height of the second connector 350. Thereby, the height of the second measurement part 140 and the second measurement module 150 connected to the second connector 350 may be adjusted.

The upper support frame 116 is configured at the upper end of the information collection and control part 107, that is, the drone storage 170 to connect the overtopping alert part 109 to the information collection and control part 107 and to support the lifting and lowering operation of the overtopping alert part 109.

The upper support frame 116 may be a frame member independent of the lower support frame 114, but is not limited thereto.

That is, the upper support frame 116 may be connected to a portion above the support frame lifting operation part 115. In this case, the upper support frame 116 and the lower support frame 114 may be connected to each other. As lower support frame 114 is moved up and down, the upper support frame 116 may also be moved up and down.

The alert part lifting housing 117 is coupled to the upper end of the upper support frame 116 and driven to adjust the height of the overtopping alert part 109 under control of the collection controller 160 of the information collection and control part 107. It may be composed of a typical cylinder member.

The alert part lifting frame 118 is coupled with the alert part lifting housing 117, and the overtopping alert part 109 is mounted on the upper end thereof, such that the height of the overtopping alert part 109 is adjusted according to driving of the alert part lifting housing 117.

The alert part lifting frame 110 includes an alert part connection frame 118a. First and second image capture means 182 and 184, a warning sound output module 186, and a lighting means 188 constituting the overtopping alert part 109 are mounted along an upper circumferential surface of the alert part connection frame 118a.

Here, the alert part connection frame 118a may be disposed at each branch point on the outer circumferential surface of the alert part lifting frame 110.

In addition, the alert part connection frame 118a may be arranged perpendicular to the alert part elevation frame 110.

In addition, the alert part connection frame 118a may be formed in a hollow shape to accommodate a communication cable and a power cable for the transmission and reception of data between the collection controller 160 and the first and second image capture means 182 and 184, the warning sound output module 186, and the lighting part 188 and supply of power.

The alert part elevating frame 118 may also be formed in a hollow shape like the alert part connection frame 118a to accommodate the communication cable and the power cable.

The first pressure measurement part 103 coupled to the frame part 101 of the present disclosure, preferably the buried frame 112 of the support frame 110, includes the first measurement part 120 and the first measurement module 130.

The first measurement part 120 includes a first measurement body 122 equipped with the first measurement module 130 to measure the shock pressure of waves colliding with the marine structure 10 and configured to make the first measurement module 130 installed on the marine structure 10 such as a breakwater at the same inclination angle as the marine structure 10, and a first connection body 124 configured to adjust the inclination angle of the first measurement body 122 and support the first measurement body 122 and the first connector 340 to be connected.

One side of the first measurement body 122, preferably, the side exposed to the outside of the marine structure 10 is open. The first measurement body 122 collects the collision pressure generated when waves collide, and transmits the collected wave pressure information to the collection controller 160 of the information collection and control part 107. The first measurement body 122 includes a first sensor mounting part 122a providing a mounting space allowing the first measurement module 130 to be mounted therein, and an operation guide groove 122b connected to a measurement angle adjusting means 360 configured in the first connection body 124 guide the first measurement body 122 to rotate by a predetermined angle.

Here, the operation guide groove 122b may be formed in the upper and lower portions of the rear part of the first measurement body 122, respectively.

Also, the first measurement body 122 includes a first protective panel 126 seated on one open side and configured to protect the first measurement module 130 mounting on the first sensor mounting part 122a, and a first waterproof member 125 configured to seal the gap between the first measurement body 122 and the first protective panel 126 to block seawater from flowing into the first sensor mounting part 122a.

Also, the first measurement body 122 includes a first shock transmission member 128 coupled to the rear of the first protective panel 126 and configured to transmit the collision pressure of the waves to the first measurement module 130 when colliding with waves.

The first shock transmission member 128 includes a plurality of first shock transmission members arranged on the upper portion, the middle portion and the lower portion of the rear surface of the first protective panel 126 at equal intervals. In the present disclosure, the first shock transmission member 128 is composed of nine shock transmission members divided into three groups of three members disposed on the upper portion, the middle portion, and the lower portion, respectively The first connection body 124 is detachably coupled to the rear of the first measurement body 122 to support the same such that the first measurement body 122 may be stably installed on the marine structure 10. It also connects the first measurement module 130 and the first connector 340 such that data transmission and reception and power supply may be performed between the first measurement module 130 and the first connector 340.

The first connection body 124 may include a plurality of assembly unit blocks, and may be configured such that the assembly unit blocks are stacked and coupled to each other.

Accordingly, while the first connection bodies 124 are connected to match the width of the marine structure 10, the surface of the first measurement body 122 may be positioned in the same plane as the surface of the marine structure 10 to enable construction.

The measurement angle adjusting means 360 may be configured in any one of the assembly unit blocks coupled to the rear of the first measurement body 122 in the first connection body 124.

Here, the measurement angle adjusting means 360 has an end rotatably coupled to the operation guide groove 122*b* formed in the first measurement body 122. As the measurement angle adjusting means 360 is pulled out or inserted, it adjusts the inclination angle of the first measurement body 122 such that the inclination angle of the marine structure 10 is equal to the inclination angle of the first measurement body 122 during installation in the marine structure 10.

The measurement angle adjusting means 360 may be composed of a typical cylinder member, and may be configured to operate under control of the collection controller 160.

The first measurement module 130 measures the collision pressure of the waves colliding with the marine structure 10, generates wave pressure information corresponding to the measured collision pressure of the waves, and transmits the generated information to the collection controller 160 of the information collection and control part 107.

In addition, the first measurement module 130 may include a typical pressure sensor, and is configured to determine whether waves are generated or whether waves collide even at night by the lighting means 188 provided in the overtopping alert part 109, which will be described later.

The first measurement module 130 includes a first shock absorbing member 132 seated on a bottom surface of the first sensor mounting part 122*a* to absorb the shock of wave pressure transmitted to the first measurement module 130, a first sensor connector 134 arranged on the circumferential surface of the first measurement module 130 and configured to transmit information on the shock pressure of waves measured by the first measurement module 130 to a first measurement module controller 136, and the first measurement module controller 136 configured to transmit the information on the shock pressure of waves transmitted from the first sensor connector 134 to the collection controller 160.

Here, the first measurement module controller 136 is connected to the first connection terminal module 342.

Upon receiving a control signal for angle adjustment of the measurement angle adjusting means 360 from the collection controller 160, the first measurement module controller 136 may control the measurement angle adjusting means 360 to operate as much as the inclination angle of the first measurement part 120 and the first measurement part 120 and the measurement module 130 included in the control signal.

The second pressure measurement part 105 coupled to the frame part 101 of the present disclosure, preferably the lower support frame 114 of the support frame 110, includes the second measurement part 140 and the second measurement module 150.

When overtopping occurs due to waves colliding with the marine structure 10, the second measurement part 140 measures an overtopping amount for the overtopping, and transmits the measured overtopping amount information to the information collection and control part 107. The second measurement part 140 includes a second measurement body 142 having the second measurement module 150 mounted thereon such that the second measurement module 150 is installed on the road surface 20 of the marine structure 10 such as a breakwater, and a second connection body 144 configured to support connection between the second measurement body 142 and the second connector 350.

The second measurement body part 142 is provided with a second sensor mounting part 142*a* that is open on one side, preferably, the side exposed to the outside of the road surface 20, and provides a mounting space in which the second measurement module 150 can be mounted.

The second measurement body 142 may be configured in the same form as the components constituting the first measurement body 122. The second measurement body 142 may include a second protective panel 146 configured to protect the second measurement module embedded in the second sensor mounting part 142*a*, a second waterproof member 145 configured to seal the gap between the second measurement body 142 and the second protective panel 146 to block seawater from flowing into the second sensor mounting part 142*a*, and a second shock transmission member 148 coupled to the rear portion of the second protective panel 146 and configured to transmit the collision pressure of the waves to the second measurement module 150 when the waves collide.

Like the first shock transmission member 128 described above, the second shock transmission member 148 includes a plurality of second shock transmission members on the upper portion, the middle portion and the lower portion of the rear surface of the second protective panel 146 at equal intervals. In the present disclosure, the first shock transmission member 128 is composed of nine shock transmission members divided into three groups of three members disposed on the upper portion, the middle portion, and the lower portion, respectively.

The second connection body 144 is detachably coupled to the rear of the second measurement body 142 to support the same such that the second measurement body 142 may be stably installed on the road surface 20. It also connects the second measurement module 150 and the second connector 350 such that data transmission and reception and power supply may be performed between the second measurement module 150 and the second connector 350.

The second measurement module 150 is installed on the road surface 20, and is configured to collide with waves, in other words, overtopping flowing over the marine structure 10 into the road surface 20. The second measurement module 150 measure the collision pressure of the overtopping and transmits information on the measured collision pressure of the overtopping to the collection controller 160.

In addition, the second measurement module 150 may include a typical pressure sensor, and allows a person to determine whether overtopping occurs or whether an overtopping collision occurs even at night with the naked eye by the lighting means 188 provided in the overtopping alert part 109, which will be described later.

The second measurement module 150 includes a second shock absorbing member 152 seated on a bottom surface of the second sensor mounting part 142*a* to absorb the shock of overtopping transmitted to the second measurement module 150, a second sensor connector 154 arranged on the circumferential surface of the second measurement module 150 and configured to transmit information on the overtopping amount measured by the second measurement module 150 to a second measurement module controller 156, and the second measurement module controller 156 configured to transmit the information on the overtopping amount transmitted from the second sensor connector 154 to the collection controller 160.

Here, the second measurement module control part 156 is connected to the second connection terminal module 352 connected to the second connector 150.

Upon receiving a control signal for driving of the measurement module position adjusting member 370 from the collection controller 160, the second measurement module controller 156 may operate to control the heights of the second measurement part 140 and the measurement module 150, such that the surface of the second measurement module 150 may be positioned in the same plane as the surface of the road surface 20. Thereby, installation may be facilitated, and the repair work on the road surface 20 may be performed even without removing the second measurement part 140 and the second measurement module 150.

The overtopping alert part 109, which is coupled to the frame part 101 of the present disclosure, preferably the alert part lifting frame 118 and the alert part connection frame 118*a* of the support frame 110, is an overtopping prediction device 100 includes a first image capture means 182 configured to capture and collect images of the surroundings around the overtopping prediction device 100 and transmit the collected images of the surroundings to the collection controller 160, a second image capture means 184 selectively driven according to the overtopping prediction information and configured to provide information on persons located around the overtopping prediction device 100, a warning sound output module 186 configured to transmit an alert sound to the surroundings around the overtopping prediction device 100 to evacuate people when overtopping occurs, a lighting means 188 configured to provide predetermined light to the first and second pressure measurement parts 103 and 105 such that information on the collision pressure and overtopping amount of the waves is collected even at night, and an alert information module 190 configured to deliver an warning message according to the occurrence of the overtopping to people moving toward the overtopping prediction device 100.

The first image capture means 182 is mounted on the alert part connection frame 118*a* and is configured to collect image information about the first and second pressure measurement parts 103 and 105 installed in the marine structure 10 and the surroudings around the first and second pressure measurement parts 103 and 105. It may collect image information about waves and overtopping heading toward the first and second pressure measurement parts 103 and 105 and transmit the same to the collection controller 160.

The first image capture means 182 transmits image information about waves and overtopping formed at locations adjacent to the first and second pressure measurement parts 103 and 105 and image information about waves captured by the drone 202, which will be described later, to the overtopping prediction system 500 via the collection controller 160, such that the overtopping prediction system 500 analyzes each piece of the image information and determines whether overtopping has occurred according to the result of the image analysis.

In addition, the first image capture part 182 is configured to collect image information about the waves and overtopping formed at locations adjacent to the first and second pressure measurement parts 103 and 105 not only during the day but also at night through the lighting means 188.

The second image capture means 184 may be a typical thermal imaging camera, and is configured to generate information on the number of people located within a predetermined range from the overtopping prediction device 100, and transmit the generated person information to collection controller 160.

The second image capture means 184 is driven under control of the collection controller 160, and is configured to collect information on the number of people located around the overtopping prediction device 100. Also, when overtopping occurs, the second image capture means 184 collects information on the number of evacuated people.

The information on the number of evacuated people may be counted in real time, such that entry and exit of people around the overtopping prediction device 100 may be managed based on the counting information.

The second image capturing part 184 may be configured to transmit counting information to the collection controller 160, and the collection controller 160 may analyze the counting information to manage the entry and exit.

Here, the counting information refers to information obtained by comparing numerical information about the number of people present within a predetermined range from the overtopping prediction device 100 before the occurrence of overtopping, and numerical information about the number of people present within the range after the occurrence of overtopping. It may be numerical information about the difference between information about the number of people before the overtopping occurs and information about the number of people after the overtopping occurs, and may change in real time.

The warning sound output module 186 is configured to output an alert sound under control of the collection controller 160 when overtopping occurs, and may include a typical speaker.

The lighting means 188 emits LED light to the first and second pressure measurement parts 103 and 105 to enable the first and second image capture means 182 and 184 to smoothly collect image information about waves and overtopping during the day as well as at night, such that quantitative measurement of the overtopping amount is performed in both daytime and nighttime, and the information is used as basic data to determine whether overtopping occurs even at night.

The alert information module 190 emits LED light around the overtopping prediction device 100 when overtopping occurs such that people located within a predetermined range from the overtopping prediction device 100 recognize the overtopping. The alert information module 190 includes a warning light module 192 configured to emit LED light.

The alert information module 190 is driven under control of the collection controller 160, and may be configured to adjust the intensity of light from the warning light module 192 according to the waves and the overtopping amount.

The intensity of the LED light emitted through the warning light module 192 may be proportional to the force of the waves colliding with the first pressure measurement part 103 or the force of the waves colliding with the second pressure measurement part 105. Thus, the safety of citizens approaching the breakwater may be ensured by identifying the presence or absence of overtopping even from a distance.

In addition, the alert information module 190 may further include an warning light rotating device such as a typical rotary motor, gear assembly, belt, pulley, and the like such that the light emitting position of the warning light module 192 may be controlled according to the control of the collection controller 160.

The information collection and control part 107, which is coupled to the frame part 101 of the present disclosure, preferably the upper end of the lower support frame 114 of the support frame 110, includes a collection controller 160 and a drone storage 170.

Here, the drone storage 170 is connected to a drone linkage part 550 of the overtopping prediction system 500, which will be described later, over a network and configured to interwork therewith. The drone storage 170 receives a control signal transmitted from the drone linkage part 550 and enables the drone 202 to fly. It collects image information about people or a sea surface around the overtopping prediction device 100 through the drone 202, and issues a remote alert when overtopping occurs.

The drone storage 170 includes a drone accommodation part formed as an internal space where the drone 202 can take off and land. The drone accommodation part 204 is configured such that one side thereof is open. The drone storage 170 also includes an opening and closing door 172 configured to open and close the open drone accommodation part 204, a sealing frame 174 configured to provide a sealing force during a closing operation of the opening and closing door 172, a locking means 176 configured to be set in a locking mode to prevent the opening and closing door 172 from being opened, and a temperature and humidity controller 178 configured to control a temperature and humidity of the drone accommodation part 204.

The drone storage 170 further includes an operation controller 210, a fixed body lifting means 220, and a drone position fixing body 230 in order to support the drone 202 in a landing state to stably maintain the drone 202 in a fixed state on an upper surface of the drone accommodation part 204.

The opening and closing door 172 includes a door opening/closing guide 172a configured to guide the opening and closing door 172 to perform the opening/closing operation by rotating upward.

The door opening/closing guide 172a may be arranged at an upper portion of the opening and closing door 172, and may rotate under control of the operation controller 210 to open and close the opening and closing door 172.

The sealing frame 174 includes a penetrated entry/exit portion 174a formed on the inner surface of the opening and closing door 172, preferably coupled to the perimeter surface of the open surface of the drone accommodation part 204, and allowing that the drone 202 to enter and exit through a central portion thereof.

The sealing frame 174 is configured to be closely coupled with the inner surface of the opening and closing door 172 according to the closing operation of the opening and closing door 172. Coupling between the sealing frame 174 and the opening and closing door 172 may enhance sealing of the drone accommodation part 204, thereby preventing external contaminants from entering the drone accommodation part 204.

Also, the sealing frame 174 has a locking means 176 arranged on a lower surface thereof so as to be set in a locked mode as the opening and closing door 172 is coupled to the sealing frame 174 under control of the operation controller 210.

Here, the locking means 176 may be a typical electromagnet. When power is applied from the operation controller 210, the locking means 176 may be coupled with the opening and closing door 172 by magnetic force.

The temperature and humidity controller 178 serves to maintain the temperature and humidity in the space of the drone accommodation part 204 to be constant to prevent the drone 202 in a landing state from malfunctioning due to temperature and humidity.

The temperature and humidity controller 178 may include a discharge fan. The temperature and humidity of the drone accommodation part 204 may be adjusted by driving the discharge fan under control of the operation controller 210.

Here, the operation controller 210 may be operatively connected with the drone linkage part 550 of the overtopping prediction system 500 over a network. The operation controller 210 controls the opening and closing operation of the opening and closing door 172 of the drone storage 170 and the magnetization of the locking means 176 such that the drone 202 can take off and land according to the control signal transmitted from the drone linkage part 550, and controls the operation of the fixed body lifting means 220 to fix the position of the drone 202.

The fixed body elevating means 220 configured in the drone storage part 170 may be configured as a conventional cylinder member, an actuator, or the like, and may have a lifting rod provided at a leading edge thereof to be coupled to the drone position fixing body 230 is coupled.

The drone position fixing body 230 may be seated in close contact with the upper surface of the drone 20 when the drone lifting means 220 is lowered, and the outer surface of the frame including the flight propeller of the drone 20 may be detachably inserted into the drone position fixing body 230.

he drone position fixing body 230 is configured to prevent the drone storage 170 from being shaken by external weather, prevents a predetermined vibration transmitted to the drone storage 170 from changing the fixed position of the drone 202 to interfere with charging of the drone 202, or prevents the drone 202 from colliding with the peripheral surface of the entry/exit portion 174a during take-off and landing due to the varied position.

The drone storage unit 170 may further include a charging module 240 configured to charge the flight power of the landed drone 202. The charging module 240 may include, but is not limited to, a wirelessly rechargeable battery.

The collection controller 160 controls the operation of the overtopping prediction device 100. In particular, it receives and stores the wave pressure information and the collision pressure information about the overtopping transmitted from the first and second pressure measurement parts 103 and 105, and transmits each piece of the stored information to the overtopping prediction system 500 such that occurrence of overtopping may be predicted.

In addition, the collection controller 160 may control the operation of the support frame lifting operation part 115 or the measurement module position adjusting member 370 for the lifting operation of the lower support frame 114 to position the second pressure measurement part 105 coupled to the lower support frame 114 in the same plane as the surface of the road surface 20.

In addition, the collection controller 160 may control the driving of the alert part lifting housing 117 to adjust the height of the overtopping alert part 109 connected to the alert part lifting housing 117.

In addition, the collection controller 160 of the present disclosure is connected to the components constituting the overtopping alert part 109 over a network, and controls the operations of the components constituting the overtopping alert part 109, that is, the first and second image capture means 182 and 184, the warning sound output module 186, the lighting means 188, and the alert information module 190.

The collection controller 160 is connected to the first image capture means 182 over a network to control operation of the first image capture means 182 and set a capture range.

In addition, the collection controller 160 receives and stores image information captured by the first image capture means 182, namely, image information about waves formed at a location adjacent to the first pressure measurement part 103, and transmits the stored wave image information to the wave information collector 510 of the overtopping prediction system 500.

In this case, the collection controller 160 may set the capture range of the first image capture means 182 to collect and store image information about waves (or overtopping) heading toward the second pressure measurement part 105 across the marine structure 10, in addition to the first pressure measurement part 103, and may be configured to transmit the stored image information about the waves to the wave information collector 510 of the overtopping prediction system 500.

Here, the collection controller 160 may be connected to a prediction controller 570 of the overtopping prediction system 500, which will be described later, over a network, and may be configured to drive the first image capture means 182 such that the image capture is performed only when there is a request from the prediction controller 570 to collect wave image information for the second pressure measurement part 105.

In addition, the collection controller 160 is connected to the second image capture means 184 over a network to control driving of the second image capture means 184 and set a capture range.

The collection controller 160 may be configured to receive and store the captured image information, i.e., image information about people present at a location adjacent to the overtopping prediction device 100, from the second image capturing means 184, analyze the stored image information about the people to generate information on the number of people, and transmit the generated information on the number of people to the prediction controller 570 of the overtopping prediction system 500.

The collection controller 160 may analyze the image information about the people transmitted from the second image capture means 184 to generate counting information that is counted in real time, and transmit the generated counting information to the prediction controller 570 of the overtopping prediction system 500.

In addition, the collection controller 160 receives overtopping prediction information from the prediction controller 570 of the overtopping prediction system 500. When the received overtopping prediction information includes overtopping occurrence time information and overtopping amount information, he collection controller 160 determines that overtopping occurs at that time and controls the operation of the warning sound output module 186, the lighting means 188, and the alert information module 190.

In addition, when pressure information about waves (or overtopping) is transmitted from the second pressure measurement part 105, the collection controller 160 may determine that an overtopping has occurred in the area, and that there is a possibility that damage may be caused by the overtopping, and controls the operation of the warning sound output module 186 such that an alert information voice corresponding to the overtopping alert signal is output.

Here, when the level of overtopping from the prediction controller 570 of the overtopping prediction system 570, which will be described later, corresponds to a high risk level, and thus an overtopping evacuation signal to prevent damage by overtopping is received, the collection controller 160 may control the warning sound output module 186 to output a danger alert voice to cause people located around the overtopping prediction device 100 to leave the area, while controlling the operation of the alert information module 190.

The collection controller 160 may determine a risk level of the overtopping occurring in a corresponding area by comparing the collision pressure information (the overtopping amount information) about the overtopping transmitted from the second pressure measurement part 105 with pre-stored overtopping level information, and control the warning light module 192 provided in the alert information module 190 according to the determined overtopping risk level to control the intensity of LED light emitted from the warning light module 192.

The collection controller 160 may not only control the intensity of the LED light, but also control the driving of the warning light rotating device such that the LED light emitted from the warning light module 192 is emitted onto the road surface 20. The LED light emitted onto the road surface 20 may be controlled to serve as a boundary line for setting a boundary area for the danger zone according to the occurrence of overtopping.

Accordingly, people located in the vicinity of the overtopping prediction device 100 may be caused to check the LED light emitted onto the road surface 20 and avoid entering the boundary area set by the light, thereby preventing a life-threatening accident that may be caused by overtopping.

In addition, the above-described pre-stored overtopping level information may be a table of grading of a sea state according to the above-described Beaufortscale and a table of grading for sea conditions and overtopping levels. The collection controller 160 may determine an overtopping risk level based on the pre-stored overtopping level information. However, embodiments are not limited thereto. An overtopping risk level may be determined based on overtopping occurrence cycle prediction information generated through the overtopping prediction system 500, which will be described later.

In addition, the collection controller 160 may perform a control operation to adjust light emission of the lighting means 188 and the intensity of the light, such that the first and second image capture means 182 and 184 may smoothly collect image information about waves and overtopping during the day as well as at night.

Upon receiving an alert signal for occurrence of overtopping around the overtopping prediction device 100 from the overtopping prediction system 500, the collection controller 160 may control operation of an entry blocking assembly 400 that blocks entry of a person or vehicle into the vicinity of the overtopping prediction device 100

The entry blocking assembly 400 is installed on the top of the road surface 20, and is rotated under control of the collection controller 160 to be drawn out to the top of the road surface 20 to block people from entering the boundary area where damage may be caused by the overtopping.

The entry blocking assembly 400 includes a blocking body 410 buried in the road surface 20 and configured to support the rotational operation of the entry blocking assembly 400, a barricade panel 420 rotatably coupled to the blocking body 410 and configured to be drawn out to the top of the road surface 20 under control of the collection controller 160, a barricade driver 430 coupled to the blocking body 410 and configured to rotate the barricade panel 420 under control of the collection controller 160, a warning display panel 440 coupled to the barricade panel 420 and configured to send a warning message to block entry into a boundary area when drawn out of the top of the road surface 20, a transparent protective plate 450 configured to protect the warning display panel 440, and a seating support sheet 460 arranged on the interior bottom surface of the blocking body 410 to absorb shock transmitted to the barricade panel 420.

The blocking body 410 may be arranged at a position spaced apart from the overtopping prediction device 100 by a predetermined distance. It may be disposed on the road surface 20 on which the marine structure 10 is installed.

The blocking body 410 may be configured as a rectangular frame, and has an open top. Also, a sheet insertion groove 412 to which the seating support sheet 460 is coupled is formed on the bottom surface of the open portion.

The sheet insertion groove 412 may be configured such that the bottom surface of the barricade panel 420 may be seated thereon in a close contact manner.

In addition, the barricade driver 430 is mounted on the blocking body 410, and a driving support 414 configured to electrically connect the barricade driver 430 and the collection controller 160 is formed on the barricade driver 430.

The driving support 414 may be configured to accommodate a typical communication cable and power cable, but is not limited thereto. The driving support 414 may be configured such that the barricade driver 430 and the collection controller 160 are connected to each other over a network.

The barricade panel 420 has one end rotatably coupled to the barricade driver 430. A display panel coupling groove 422 into which the warning display panel 440 is mounted is formed on the top surface of the barricade panel 420. Also, a protective plate detachable groove 424 to which the transparent protective plate 450 is coupled is formed above the display panel coupling groove 422.

When overtopping does not occur, the barricade panel 420 may serve as a sidewalk block on the road surface 20. Only when overtopping occurs, the barricade panel 420 is drawn out of the blocking body 410 by rotating around the barricade driver 430 under control of the collection controller 160, such that people located around the overtopping prediction device 100 may better recognize the warning display panel 440, and the road surface 20 is blocked.

Here, the warning display panel 440 outputs a warning message by the occurrence of overtopping under control of the collection controller 160, and the same message as the warning message output by the warning sound output module 186 described above.

When overtopping does not occur, that is, in normal times, the warning display panel 440 may receive advertisement information provided from the overtopping prediction system 500 through the collection controller 160 and display the same.

The transparent protective plate 450 prevents the warning display panel 440 from being damaged when a number of users walk on the road surface 20, and serves to prevent external contaminants from penetrating into the warning display panel 440.

The seating support sheet 460 absorbs shocks generated when the users walk to prevent the warning display panel

440 from being damaged by the shocks. The seating support sheet 460 may be configured as a packing member formed of rubber, but is limited thereto.

The entry blocking assembly 400 of the present disclosure configured as described above may be disposed not only on the road surface 20 of the marine structure 10, but also at various locations such as a roadway adjacent to the marine structure 10, or or sidewalks used by residents living near the marine structure 10 in order to issue an alert and block entry into the boundary areas according to the occurrence of overtopping.

Hereinafter, description will be made of the overtopping prediction system 500 connected to the above-described overtopping prediction device 100 over a network and configured to analyze various signals and information transmitted from the overtopping prediction device 100 to control flight of the drone 202 and collection of image information and to generate overtopping prediction information for predicting information on the risk level of overtopping and the occurrence cycle of overtopping by analyzing the information transmitted from the overtopping prediction device 100 and the drone 202, respectively.

Figure 15:
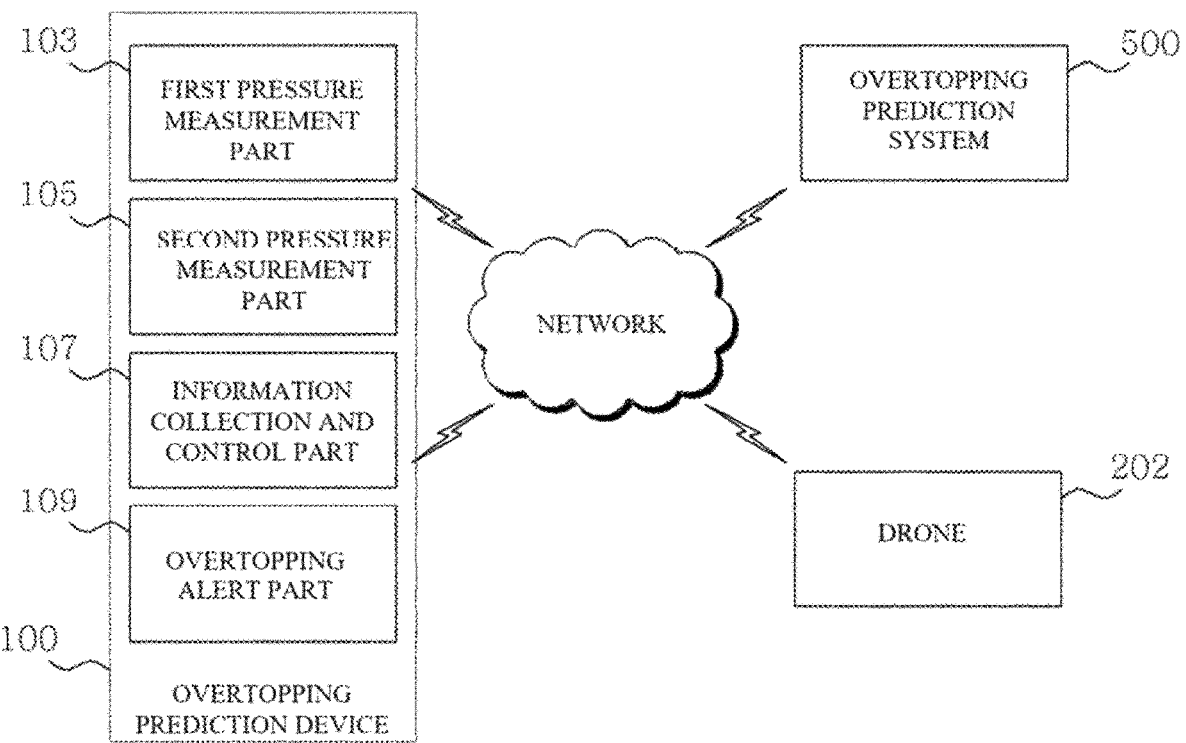
FIGS. 15 and 16 are block diagrams schematically illustrating an overtopping prediction system using an artificial intelligence overtopping prediction device according to an embodiment of the present disclosure.
Figure 16:
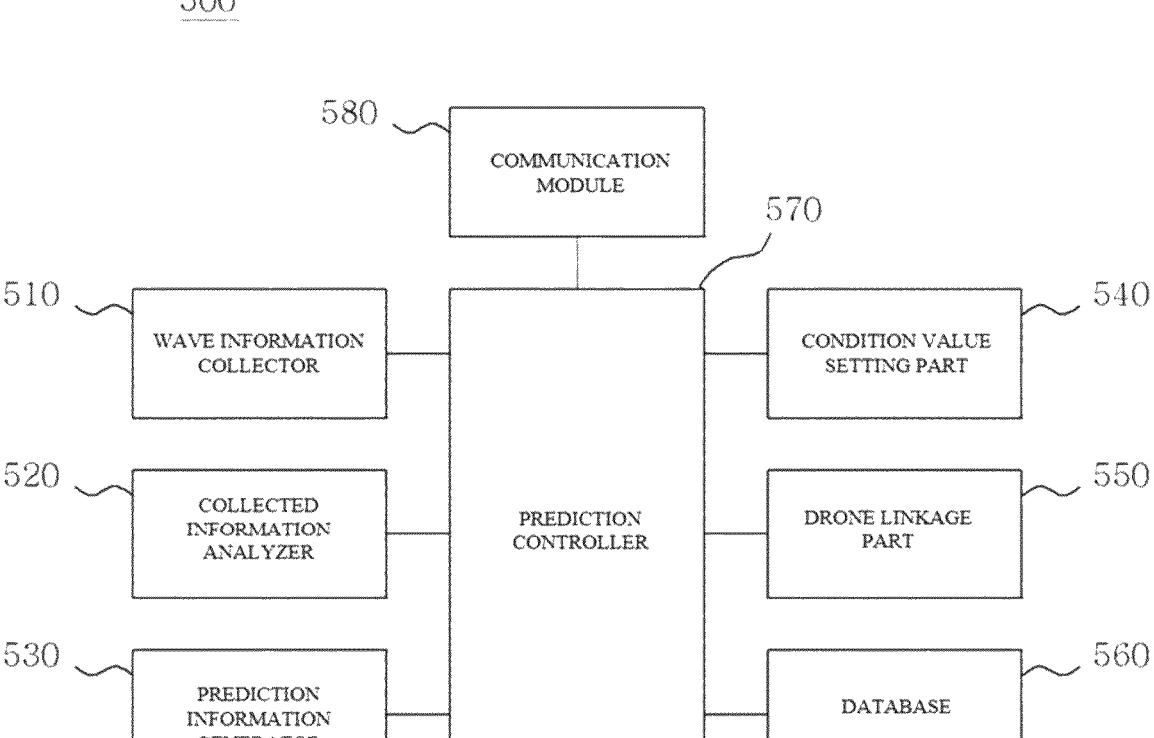

As shown in FIGS. 15 and 16, the overtopping prediction system 500 includes a wave information collector 510 configured to receive wave pressure information and information about a collision pressure of overtopping transmitted through the information collection controller 160 and transmit the same, and to operate in connection with the drone 202 to receive image information about a state of a sea surface captured by the drone 202, a collected information analyzer 520 configured to analyze the information collected by the wave information collector 510 and generate overtopping amount information about an area where the overtopping prediction device 100 is installed, a prediction information generator 530 configured to generate overtopping prediction information about the area based on the overtopping amount information generated by the collected information analyzer 520, a condition value setting part 540 configured to generate overtopping level information to enable the prediction information generator 530 to generate the overtopping prediction information, and to transmit the generated overtopping level information to the prediction information generator 530 and the collection controller 160, a drone linkage part 550 configured to collect information about whether the drone 202 is flying and image information about a sea surface at a location outside a predetermined range from the marine structure 10 and transmit the same to the collected information analyzer 520, a database 560 configured to store collected wave and overtopping image information, wave and overtopping pressure information, the overtopping amount information, the overtopping prediction information, and the overtopping level information, wherein the overtopping amount information, the overtopping prediction information, and the overtopping level information correspond to a result of analysis of the wave and overtopping image information and the wave and overtopping pressure information, a prediction controller 570 connected to the collection controller 160 over a network to control driving of the overtopping prediction system 500, the prediction controller 570 being configured to sharing the information stored in the database 560 with the collection controller 160, and a communication module 580 configured to enable network communication with the collection controller 160 and the drone 202.

The wave information collector 510 is connected to the collection controller 160 over a network. The wave information collector 510 receives, from the collection controller 160, the wave pressure information and the collision pressure information about the overtopping transmitted from the first and second pressure measurement parts 103 and 105 and transmits the same to the database 560 and to the collected information analyzer 520 such that overtopping amount information about the surroundings of the overtopping prediction device 100 is generated.

The wave information collector 510 individually transmits each of the wave pressure information and the overtopping amount information provided by the first pressure measurement part 103 and the second pressure measurement part 105 to the collected information analyzer 520.

In addition, the wave information collector 510 may receive image information captured by the first and second image capture means 182 and 184 from the collection controller 160 and transmit the received information to the database 560 and to the prediction information generator 530 such that overtopping prediction information is generated.

In this regard, the wave information collector 510 may receive image information about the sea surface captured by the drone 202 from the drone linkage part 550, and transmit the received sea surface image information to the database 560 and to the collected information analyzer 520 such that to overtopping prediction information is generated.

However, embodiments are not limited thereto. When the wave information collector 510 is linked to the drone 202 through the drone linking part 550, it may be connected to the drone 202 over a network to directly receive sea surface image information.

The collected information analyzer 520 analyzes the wave pressure information measured by the first pressure measurement part 103 to perform operations including generating overtopping amount information by converting the wave pressure into an overtopping amount per unit area, and transmitting the generated overtopping amount information to the prediction information generator 530 to generate the overtopping prediction information.

Also, the collected information analyzer 520 analyzes the information about the collision pressure of the overtopping measured by the second pressure measurement part 105 to generate overtopping amount information by converting the collision pressure of the overtopping into an overtopping amount per unit area In analyzing the wave pressure information measured by the first pressure measurement part 103, the collected information analyzer 520 may perform an analysis regarding whether the overtopping amount information corresponds to a level of overtopping likely to collide with the second pressure measurement part 105.

The collected information analyzer 520 may be configured to compare the overtopping level information provided by the condition value setting part 540 with the overtopping amount information computed by converting the wave pressure information, and transmit overtopping amount information corresponding to the wave pressure information to the prediction information generator 530 only when it is determined that the overtopping amount information corresponds to a level of overtopping likely to collide with the second pressure measurement part 105.

In addition, the collected information analyzer 520 may be configured to monitor, in real time, wave image information transmitted from the collection controller 160 of the overtopping prediction device 100, and transmit the wave image information monitored in real time to the database 560 so as to be stored in the database 560 in an accumulated manner.

The prediction information generator 530 compares and analyzes the overtopping amount information transmitted from the collected information analyzer 520 and the overtopping level information set by the condition value setting part 540 to generate overtopping prediction information about whether overtopping will occur in the corresponding area and transmit the generated overtopping prediction information to the collection controller 160 through the prediction controller 570.

In addition, in generating the overtopping prediction information, the prediction information generator 530 may also generate overtopping occurrence time information about a time when overtopping will occur.

When captured wave image information is included in the sea surface image information transmitted through the drone 202 and the overtopping amount information about the waves pressure information corresponding to the wave image information is overtopping amount information corresponding to a predetermined level or higher in the overtopping level information set by the condition value setting part 540, the overtopping occurrence time information may be information about the time when waves included in the sea surface image information to reach the first pressure measurement part 103.

In addition, when the prediction information generator 530 predicts that overtopping of a predetermined level or higher will occur in the corresponding area upon analysis of the information, the prediction information generator 530 may transmit the overtopping prediction information including an overtopping occurrence alert signal to the prediction controller 570.

In addition, the prediction information generating part 530 may generate overtopping occurrence cycle prediction information about an overtopping occurrence cycle by analyzing the stored real-time monitored information through the collection information analyzer 520.

The condition value setting part 540 the condition value setting part 540 is configured to analyze the image information of the sea surface captured by the drone 202, and analyze, through comparison, information on a height (wave) of the sea surface, an arrival time when the sea surface reaches to collide with the first pressure measurement part 103, and information about an amount of overtopping occurring according to the collision, and generate overtopping level information based on a result of the analysis and store the same in the database 560 to allow the prediction information generator 530 to generate the overtopping prediction information.

The condition value setting part 540 may be stored in a table of grading of the sea state or the like according to Beaufortscale, but is not limited thereto.

The drone linkage part 550 is connected to the drone 202 over a network. When an overtopping occurrence alert signal is generated by the prediction information generator 530, the drone linkage part 550 may receive a request signal for linkage with the drone 202 from the prediction controller 570 and control the flight of the drone 202 according to the linkage request signal.

The drone linkage part 550 may be linked with the operation controller 210 configured in the drone storage 170. When control of the flight of the drone 202 is performed, the drone linkage part 550 may transmit a control signal to the operation controller 210 to control the operation of each component included in the drone storage part 170.

The database 560 may store various kinds of information and data generated by the overtopping prediction system

500, and may transmit the stored information and data to the overtopping prediction device 100 under control of the prediction control unit 570.

The prediction controller 570, which may be connected to the collection controller 160 over a network through the communication module 580, is configured to transmit information transmitted from the collection controller 160 to each component, and control driving of the overtopping prediction system 500.

When the overtopping prediction information includes the overtopping occurrence alert signal, the prediction controller 570 may make a request to the collection controller 160 for real-time changing data of counting information related to image information about people transmitted from the second image capture part 184, check whether the real-time changing data is changed, and transmit, to the collection controller 160, a driving control signal for controlling driving of the alert sound output module 186, the lighting means 188, the alert information module 190, and the entry blocking assembly 400.

The network and the communication module 580 described in the present disclosure refer to a connection structure enabling exchange of information between nodes, such as a plurality of terminals and servers. Examples of the network include, but are not limited to, RF, a 3rd generation partnership project (3GPP) network, a long term evolution (LTE) network, a 5th generation partnership project (5GPP) network, a world interoperability for microwave access (WIMAX) network, Internet, a local area network (LAN), a wireless local area network (Wireless LAN), a wide area network (WAN), a personal area network (PAN), a Bluetooth network, an NFC network, a satellite broadcasting network, an analog broadcasting network, and a digital multimedia broadcasting (DMB) network.

As is apparent from the above description, the present disclosure provides the following effects.

According to an embodiment of the present disclosure, a device may be installed adjacent to a marine structure and may collect image information on waves moving toward a marine structure, analyze the occurrence of high waves toward marine structure in real time, analyze information on the pressure of waves colliding with the marine structure to identify the possibility of overtopping regardless of the shape of the coastal area and seasonal changes, and analyze collected information by artificial intelligence to generate reliable prediction information about whether overtopping will occur in the coastal area.

According to an embodiment of the present disclosure, image information on waves heading around constructed marine structures in coastal areas may be collected and analyzed in real time using a drone to predict overtopping caused by meteorological factors such as wave height, wave direction, wind direction, and wind speed, and overtopping amount information may be generated by analyzing the pressure of waves colliding with marine structures, thereby generate reliable information on presence of overtopping and overtopping prediction information. Further, the degree of overtopping may be accurately determined not only during the day but also at night. Accordingly, damage that may be caused by overtopping may be prevented by predicting the occurrence and risk of overtopping in various forms and allowing people to be quickly prepared for the overtopping.

In addition, according to an embodiment of the present disclosure, light may be emitted around a marine structure with a controlled degree of light emission according to the pressure of the waves hitting the marine structure such that the occurrence of overtopping may be recognized even from a far distance, and safety may be secured for citizens approaching the marine structure.

In addition, according to an embodiment of the present disclosure, an overtopping prediction device may be equipped with a thermal imaging camera and may thus detect presence of people approaching a breakwater at night, and count people approaching the breakwater to generate information on the number of approaching people. Thereby, recording of the entry and exit of people approaching the marine structure may be managed, and a life-threatening accident caused by overtopping may be quickly coped with.

In addition, according to an embodiment of the present disclosure, a safety boundary device may be installed on the floor adjacent to an overtopping prediction device and LED light may be emitted to form a boundary line for a boundary area where damage may be caused by overtopping when overtopping occurs. Thereby, people may be blocked from entering the area where damage may be caused by overtopping, and thus overtopping may be prevented from causing human casualties.

In addition, according to an embodiment of the present disclosure, overtopping prediction information and overtopping amount information may be generated as an overtopping prediction device can be installed even with a constructed marine structure being present. Accordingly, overtopping may be predicted regardless of the shape of the coastal area In addition, according to an embodiment of the present disclosure, when overtopping is predicted based on the overtopping prediction information analyzed by an overtopping prediction device, people in the vicinity may be alerted to the occurrence of overtopping through a visual signaling device attached to the overtopping prediction device. Thereby, the risk of an accident caused by overtopping may be significantly reduced.

Various beneficial advantages and effects of the present disclosure are not limited to what has been described above, and will be more easily understood in the following description of specific embodiments of the present disclosure.

The above description is merely an example of the technical idea of the present disclosure, and it will be apparent to those skilled in the art to which the present disclosure belongs that various modifications and variations can be made in the present disclosure without departing from the spirit and scope of the present disclosure. Therefore, the embodiments disclosed in the present disclosure are intended for description of rather than limiting of the technical idea of the present disclosure. The scope of the technical idea of the present disclosure is not limited by the embodiments explicitly described above. Thus, the scope of protection sought by the present disclosure should be determined by the appended claims and their equivalents, and all changes coming within the meaning and equivalency range of the appended claims are intended to be embraced therein.

What is claimed is:

1. An artificial intelligence overtopping prediction device comprising:

a first pressure measurement part configured to generate wave pressure information by measuring a collision pressure of waves colliding with a marine structure and transmit the generated wave pressure information;

a second pressure measurement part configured to measure an overtopping amount of waves flowing over the marine structure into a road surface and transmit information about the measured overtopping amount of the waves;

an overtopping alert part configured to collect images of surroundings around the overtopping prediction device and output an alert sound when overtopping occurs to evacuate people;

an information collection and control part comprising:

a drone storage configured to allow a drone to fly and configured to collect image information about people or sea surfaces around the overtopping prediction device through the drone and to provide a remote alert when the overtopping occurs; and a collection controller configured to control driving of the overtopping prediction device, receive and store the wave pressure information and the overtopping amount information about the waves, and transmit the wave pressure information and the overtopping amount information about the waves to an overtopping prediction system to predict occurrence of the overtopping and generate overtopping prediction information; and a frame part having a lower end buried in the marine structure, the frame part comprising a support frame allowing the first and second pressure measurement parts, the information collection and control part, and the overtopping alert part to be respectively mounted thereon.

2. The artificial intelligence overtopping prediction device of claim 1, wherein the support frame comprises:

a buried frame buried in the road surface;

a lower support frame coupled to an upper portion of the buried frame so as to be lifted and lowered, the lower support frame allowing the information collection and control part to be mounted thereon;

an upper support frame having an alert part lifting housing coupled to an upper end thereof to adjust a height of the overtopping alert part;

an alert part lifting frame coupled to the alert part lifting housing and having an overtopping alert part mounted on an upper end thereof to adjust the height of the overtopping alert part according to whether the alert part lifting housing is driven;

a first connector provided in the buried frame and configured to connect the first pressure measurement part and the information collection and control part;

a second connector provided in the lower support frame and configured to connect the second pressure measurement part and the information collection and control part.

3. The artificial intelligence overtopping prediction device of claim 2, wherein the buried frame further comprises:

a prop frame coupled to a lower end of the buried frame and configured to improve coupling between the buried frame and the road surface.

4. The artificial intelligence overtopping prediction device of claim 2, wherein the lower support frame further comprises a support frame lifting operation part comprising:

a lifting rotation means connected to the information collection and control part and coupled to an upper end of the lower support frame; and a lifting gear member arranged on one surface of the lower support frame and driven by the lifting rotation means to lift or lower the lower support frame.

5. The artificial intelligence overtopping prediction device of claim 1, wherein the first pressure measurement part comprises:

a first measurement module configured to generate the wave pressure information by measuring the collision pressure of the waves colliding with the marine structure and transmit the generated wave pressure information to the information collection and control part; and a first measurement part configured to support the first measurement module to be coupled to the marine structure at the same inclination angle as the marine structure.

6. The artificial intelligence overtopping prediction device of claim 5, wherein the first measurement module comprises:

a first shock absorbing member seated on a bottom surface of the first measurement part and configured to absorb a shock of wave pressure transmitted to the first measurement module;

a first sensor connector configured to transmit information on the collision pressure of the waves measured by the first measurement module;

a first measurement module controller configured to receive the information on the collision pressure of the waves, generate wave pressure information, and transmit the generated wave pressure information to the information collection and control part.

7. The artificial intelligence overtopping prediction device of claim 6, wherein the first measurement part comprises:

a first measurement body configured to receive the first measurement module inserted thereinto and couple the first measurement module to the marine structure;

a first connection body configured to adjust an inclination angle of the first measurement body and connect the first measurement body to the frame part; and a measurement angle adjusting means provided in the first connection body and configured to adjust inclination angles of the first measurement part and the first measurement module under control of the first measurement module controller.

8. The artificial intelligence overtopping prediction device of claim 7, wherein the first measurement body comprises:

a first protective panel configured to protect the first measurement module;

a first waterproof member configured to seal a gap between the first measurement body and the first protective panel;

a first shock transmission member coupled to a rear portion of the first protective panel and configured to transmit the collision pressure of the waves to the first measurement module.

9. The artificial intelligence overtopping prediction device of claim 1, wherein the second pressure measurement part comprises:

a second measurement module configured to measure a collision pressure of the waves flowing over the marine structure to the road surface and transmit information on the measured collision pressure of the waves; and a second measurement part comprising:

a second measurement body having the second measurement module mounted thereon so as to be installed on the road surface; and a second connection body configured to connect the second measurement body and the frame part.

10. The artificial intelligence overtopping prediction device of claim 1, wherein the overtopping alert part comprises:

a first image capture means configured to capture and collect images of the surroundings around the overtopping prediction device and transmit the collected images of the surroundings to the collection controller;

a second image capture means selectively driven according to the overtopping prediction information and configured to provide information on persons located around the overtopping prediction device;

a warning sound output module configured to transmit an alert sound to the surroundings around the overtopping prediction device to evacuate people when overtopping occurs;

a lighting means configured to provide predetermined light to the first and second pressure measurement parts such that information on the collision pressure and overtopping amount of the waves is collected even at night; and an alert information module configured to deliver an warning message according to the occurrence of the overtopping to people moving toward the overtopping prediction device.

11. The artificial intelligence overtopping prediction device of claim 1, wherein the drone storage comprises:

a drone accommodation part configured to allow the drone to take off and land;

an opening and closing door provided on one surface of the drone accommodation part to open and close the drone accommodation part;

a sealing frame configured to provide a sealing force during a closing operation of the opening and closing door;

a locking means configured to be set in a locked mode to prevent the opening and closing door from being opened; and a temperature and humidity controller configured to control a temperature and humidity of the drone accommodation part.

12. The artificial intelligence overtopping prediction device of claim 1, wherein the collection controller is configured to:

analyze image information about people transmitted from the overtopping alert part;

generate counting information by counting the people in real time; and transmit the generated counting information to the overtopping prediction system.

13. The artificial intelligence overtopping prediction device of claim 1, wherein the collection controller is configured to:

compare the collision pressure information about the overtopping (the overtopping amount information about the waves flowing into the road surface transmitted from the second pressure measurement part with pre-stored overtopping level information;

determine a risk level of the overtopping occurring in a corresponding area; and control an intensity of light of an LED provided in the overtopping alert part according to the determined risk level of the overtopping.

14. The artificial intelligence overtopping prediction device of claim 13, wherein the collection controller sets a boundary area for a danger zone according to the occurrence of the overtopping by causing the light of the LED to be emitting onto the road surface according to the risk level of the overtopping.

15. An overtopping prediction system using an overtopping prediction device including a first pressure measurement part, a second pressure measurement part, an overtopping alert part, an information collection and control part, and a frame part, the overtopping prediction system comprising:

a wave information collector configured to:

receive wave pressure information and information about a collision pressure of overtopping transmitted through the information collection and control part and transmit the same; and operate in connection with a drone to receive image information about a state of a sea surface captured by the drone;

a collected information analyzer configured to analyze the information collected by the wave information collector and generate overtopping amount information about an area where the overtopping prediction device is installed;

a prediction information generator configured to generate overtopping prediction information about the area based on the overtopping amount information generated by the collected information analyzer;

a condition value setting part configured to:

generate overtopping level information to enable the prediction information generator to generate the overtopping prediction information; and transmit the generated overtopping level information to the prediction information generator and the information collection and control part;

a drone linkage part configured to collect information about whether the drone is flying and image information about a sea surface at a location outside a predetermined range from the marine structure and transmit the same to the collected information analyzer;

a database configured to store collected wave and overtopping image information, wave and overtopping pressure information, the overtopping amount information, the overtopping prediction information, and the overtopping level information, wherein the overtopping amount information, the overtopping prediction information, and the overtopping level information correspond to a result of analysis of the wave and overtopping image information and the wave and overtopping pressure information; and a prediction controller connected to the information collection and control part over a network to control driving of the overtopping prediction system, the prediction controller being configured to sharing the information stored in the database with the information collection and control part.

16. The overtopping prediction system of claim 15, wherein the collected information analyzer analyzes the wave pressure information measured by the first pressure measurement part to perform operations including:

generating overtopping amount information by converting the wave pressure into an overtopping amount per unit area; and transmitting the generated overtopping amount information to the prediction information generator to generate the overtopping prediction information, wherein the collected information analyzer analyzes the information about the collision pressure of the overtopping measured by the second pressure measurement part to perform operations including:

generating overtopping amount information by converting the collision pressure of the overtopping into an overtopping amount per unit area; and transmitting the generated overtopping amount information to the prediction information generator to generate the overtopping prediction information.

17. The overtopping prediction system of claim 15, wherein the collected information analyzer is configured to:

compare the overtopping level information provided by the condition value setting part with the overtopping amount information computed by converting the wave pressure information; and transmit overtopping amount information corresponding to the wave pressure information to the prediction information generator only when it is determined that the overtopping amount information corresponds to a level of overtopping likely to collide with the second pressure measurement part.

18. The overtopping prediction system of claim 15, wherein the collected information analyzer is configured to:

monitor, in real time, wave image information transmitted from the overtopping prediction device; and transmit the wave image information monitored in real time to the database so as to be stored in the database in an accumulated manner.

19. The overtopping prediction system of claim 15, wherein, in generating the overtopping prediction information, the prediction information generator is configured to:

generate overtopping occurrence time information about a time when overtopping will occur;

when it is predicted that overtopping of a predetermined level or higher will occur in the area, generate an overtopping alert signal; and generate overtopping occurrence cycle prediction information about an overtopping occurrence cycle by analyzing the stored real-time monitored information through the collection information analyzer.

20. The overtopping prediction system of claim 15, wherein the condition value setting part is configured to:

analyze the image information of the sea surface captured by the drone, and analyze, through comparison, information on a height (wave) of the sea surface, an arrival time when the sea surface reaches to collide with the first pressure measurement part, and information about an amount of overtopping occurring according to the collision; and generate overtopping level information based on a result of the analysis and store the same in the database to allow the prediction information generator to generate the overtopping prediction information.

* * * * *